United States Patent
Kataoka

[11] Patent Number: 6,031,316
[45] Date of Patent: Feb. 29, 2000

[54] VIBRATION ACTUATOR APPARATUS

[75] Inventor: Kenichi Kataoka, Yokohama, Japan

[73] Assignee: Canon Kabushiki Kaisha, Tokyo, Japan

[21] Appl. No.: 08/237,913

[22] Filed: May 4, 1994

Related U.S. Application Data

[63] Continuation of application No. 07/782,490, Oct. 24, 1991, abandoned.

[30] Foreign Application Priority Data

Oct. 25, 1990 [JP] Japan ................................ 2-288134
Nov. 13, 1990 [JP] Japan ................................ 2-306399

[51] Int. Cl.$^7$ ................................................ H01L 41/08
[52] U.S. Cl. .................................... 310/316; 318/116
[58] Field of Search ........................ 310/316, 317, 310/319, 323; 318/116

[56] References Cited

U.S. PATENT DOCUMENTS

| | | | |
|---|---|---|---|
| 4,510,411 | 4/1985 | Hakamata et al. | 310/316 |
| 4,713,571 | 12/1987 | Suzuki et al. | 310/316 |
| 4,727,276 | 2/1988 | Izukawa et al. | 310/316 |
| 4,833,358 | 5/1989 | Suzuki et al. | 310/316 |
| 4,914,337 | 4/1990 | Takagi | 310/316 |
| 4,952,834 | 8/1990 | Okada | 310/316 |
| 4,998,048 | 3/1991 | Furutsu | 318/116 |
| 5,001,404 | 3/1991 | Kataoka | 318/116 |
| 5,004,964 | 4/1991 | Kataoka et al. | 318/128 |
| 5,013,982 | 5/1991 | Sasaki | 310/316 X |
| 5,023,526 | 6/1991 | Kuwabara et al. | 318/116 |
| 5,053,669 | 10/1991 | Saeki et al. | 310/316 X |
| 5,099,180 | 3/1992 | Noguchi | 318/116 |
| 5,136,215 | 8/1992 | Izukawa | 318/116 |
| 5,146,143 | 9/1992 | Furutsu | 318/116 |
| 5,157,300 | 10/1992 | Kataoka et al. | 310/316 X |
| 5,159,253 | 10/1992 | Shimizu et al. | 310/316 X |
| 5,165,047 | 11/1992 | Shimizu et al. | 310/316 X |
| 5,173,630 | 12/1992 | Tanaka | 310/316 |

*Primary Examiner*—Mark O. Budd
*Attorney, Agent, or Firm*—Fitzaptrick, Cella, Harper & Scinto

[57] ABSTRACT

An actuator apparatus for applying an electrical signal to an electro-mechanical energy conversion element to form a vibration, and for driving a moving body based on the vibration.

When the moving speed of a moving body moved by the actuator apparatus is monitored by, e.g., an encoder, the apparatus detects the encoder output at a timing corresponding to the vibrating state of the actuator, so that an encoder output free from the influence of the vibration can be precisely detected.

19 Claims, 20 Drawing Sheets

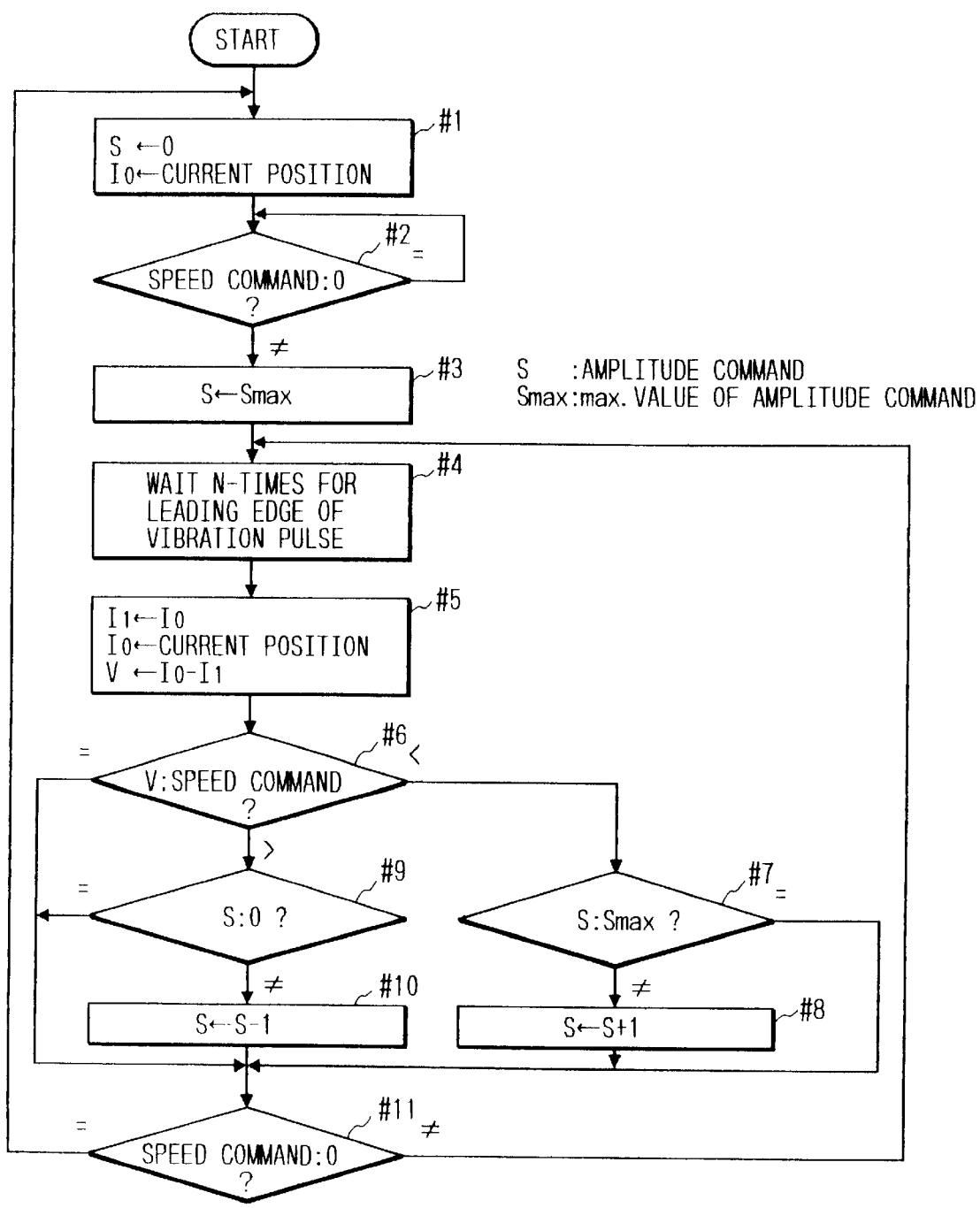

FIG. 3A
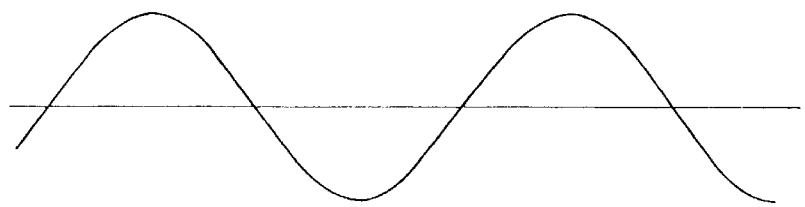
FIG. 3B
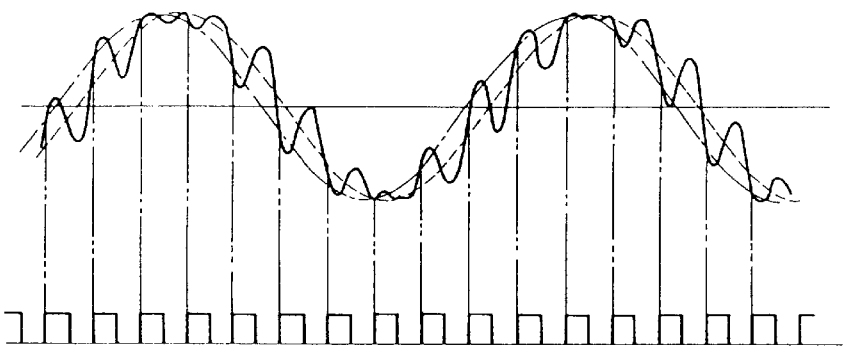
FIG. 3C
FIG. 3D
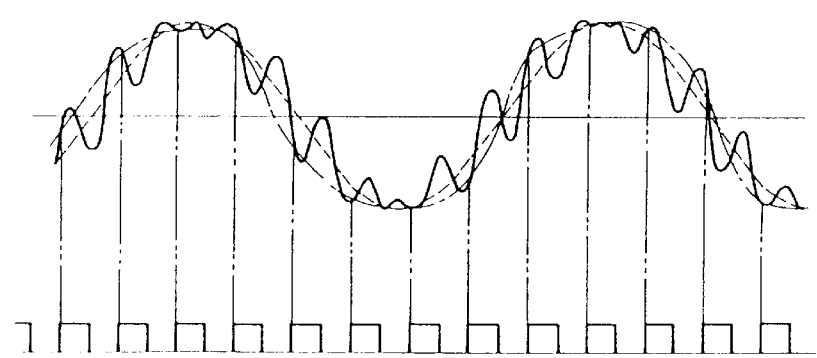
FIG. 3E

VIBRATION ACTUATOR APPARATUS

This application is a continuation of application Ser. No. 07/782,490 filed Oct. 24, 1991, now abandoned.

BACKGROUND OF THE INVENTION

1. Field of the Invention

The present invention relates to a control apparatus for driving a moving body using a vibration actuator such as a so-called ultrasonic motor.

2. Related Background Art

In recent years, a vibrator actuator, e.g., a so-called ultrasonic motor, which utilizes an electro-mechanical energy conversion element such as a piezo-electric element, an electro-strictive element, or the like, has been put into practical applications. The vibration actuator comprises a vibrating body which is vibrated by an AC power supply, and a moving body which is moved by vibration of the vibrating body while being urged against the surface of the vibrating body. In speed control of the vibration actuator (i.e., speed control of the moving body), a change in position of the moving body is detected by a detector such as an encoder mechanically connected to the moving body, and the output from the encoder is calculated by a microcomputer to detect the speed of the moving body. Thus, the vibration of the vibrating body is controlled in accordance with the detected speed.

In the conventional speed control method, a change in instantaneous position of the moving body is detected by the encoder. However, the moving body is not only moved but also vibrated since it is in contact with the vibrating body. For this reason, the encoder for detecting the moving amount of the moving body actually detects a superposed motion of the movement and the vibration of the moving body, resulting in poor reliability of the encoder output. In the conventional speed control method, when the speed of the moving body is high, the influence of the vibration of the vibrating body is relatively decreased, and the control performance is not substantially impaired. However, when the moving speed of the moving body is very low, the influence of the vibration of the moving body seriously affects the encoder output, and the precision and reliability of the encoder output are considerably impaired. Therefore, the conventional speed control method described above is not suitable for speed control of a low-speed vibration actuator or of a vibration actuator at low speed.

Even when position control is performed using the encoder, since the vibration of the vibration frequency component of the vibration actuator is superposed on the output from a position detection sensor, position data, which has a given variation width having an actual actuator position as the center, is detected, resulting in unstable position control.

SUMMARY OF THE INVENTION

One aspect of the application has as its object to provide an apparatus for performing precise detection free from the influence of vibrations when a moving state of a moving body moved by a vibration actuator is detected by, e.g., an encoder.

To attain the above object, one aspect of the application is to provide an apparatus, which detects an encoder output in synchronism with a vibration, and estimates the encoder output, thereby allowing precise detection of a moving state.

To attain the above object, one aspect of the application is to provide an apparatus, which performs speed control or position control on the basis of the encoder output.

Other objects of the present invention will be apparent from the following description of the embodiment taken in conjunction with the accompanying drawings.

BRIEF DESCRIPTION OF THE DRAWINGS

FIG. 2 is a flow chart of a control operation executed by a microcomputer included in the apparatus shown in FIG. 1;

FIG. 3A is a chart showing a state wherein no noise component is superposed on an analog output from a speed detection means in the apparatus shown in FIG. 1;

FIG. 3B is a chart showing a state wherein noise components are superposed on the analog output from the speed detection means;

FIG. 3C is a chart showing a sampling pulse signal for sampling the noise-superposed output signal shown in FIG. 3B (an output from a comparator 11 shown in FIG. 1);

FIG. 3D is a chart showing the same noise-superposed signal (an output from a rotary encoder) as that shown in FIG. 3B;

FIG. 3E is a chart showing an arbitrary clock signal for sampling the noise-superposed signal shown in FIG. 3D;

DESCRIPTION OF THE EMBODIMENTS OF THE INVENTION

An embodiment of the present invention will be described hereinafter with reference to the accompanying drawings. In the embodiment to be described hereinafter, the present invention is applied to a vibration actuator as a so-called rotary type ultrasonic motor constituted by a ring-like vibrating body and a ring-like moving body. However, the vibration actuator to which the present invention is applied is not limited to this. For example, the present invention may be applied to a reciprocal type actuator, a swing type actuator, and the like.

Figure 1:
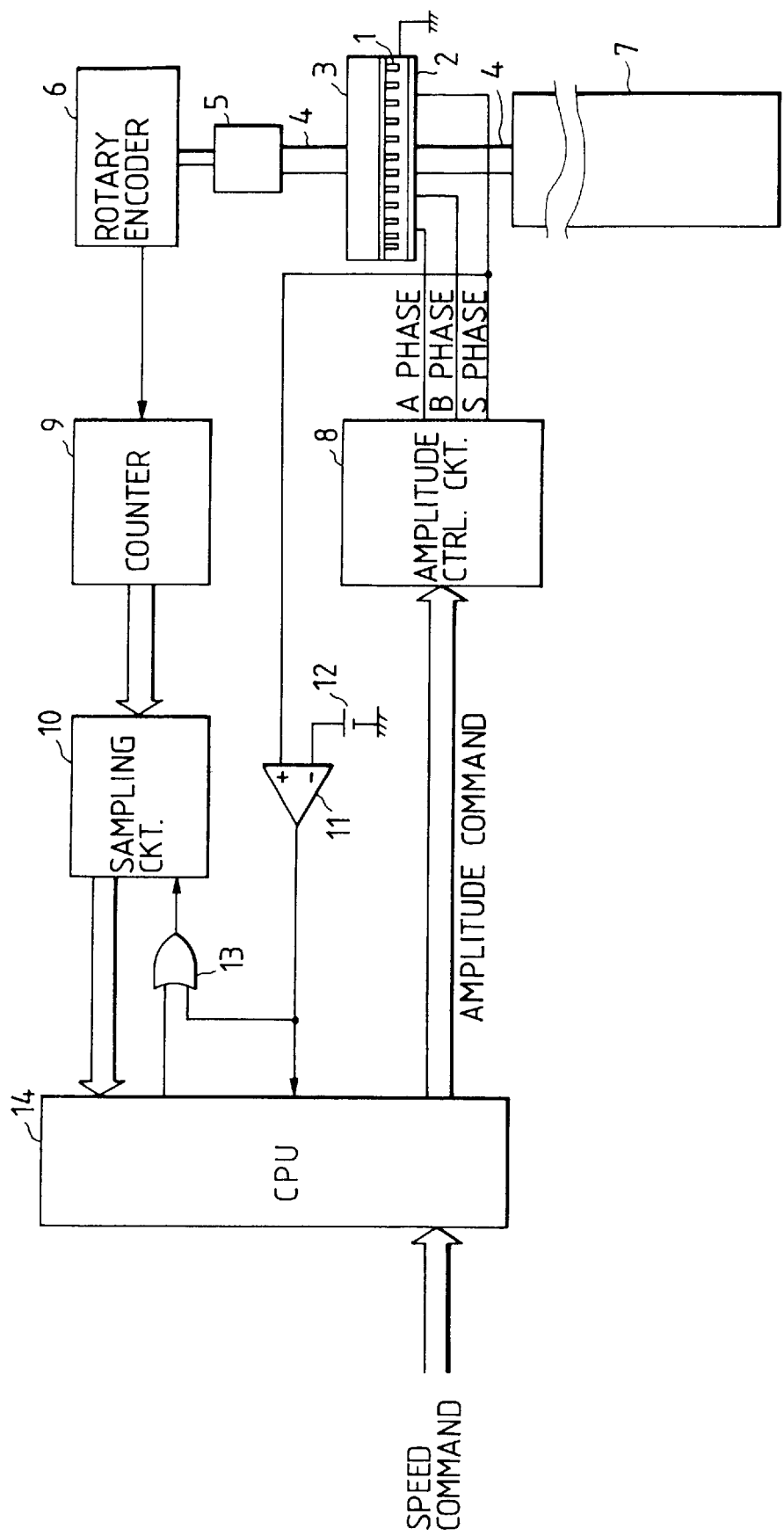
FIG. 1 is a schematic diagram showing a speed control apparatus according to the first embodiment of the present invention.

FIG. 1 is a schematic diagram showing a speed control apparatus according to the first embodiment of the present invention. The speed control apparatus shown in FIG. 1 includes a ring-like vibrating body 1 fixed to a support member (not shown), piezo-electric elements 2 which are fixed to the vibrating body 1 and serve as electro-mechanical energy conversion elements so as to produce a travelling wave vibration on the surface of the vibrating body 1, a rotor (i.e., a moving body) 3 which is moved along the circumferential direction of the vibrating body 1 while being urged against the surface of the vibrating body 1, a shaft 4 fixed to the rotor 3, a coupling 5 fixed to one end of the shaft 4, a rotary encoder 6, attached to one end of the coupling 5, for outputting position data corresponding to the rotation of the rotor, a load 7 (e.g., a driven rotary body such as a roller) attached to the other end of the shaft 4, a vibration amplitude control circuit 8 for applying two different AC drive voltages A and B having a 90° phase difference therebetween to the piezo-electric elements 2, and for fetching a vibration detection signal S generated by a vibration detection electrode arranged in the piezo-electric elements 2 (for further details of the electrode, see U.S. Pat. No. 4,713,571, U.S. Pat. No. 4,833,358 and the like), a counter 9 for counting output data from the rotary encoder 6, a sampling circuit 10 for sampling an output from the counter 9, a comparator 11 for comparing a predetermined voltage value with an output from the vibration detection electrode, a battery 12 for setting a reference voltage of the comparator 11, an OR gate 13, and a CPU 14 for generating an amplitude command (i.e., a speed control signal) for controlling the vibration amplitude control circuit 8 on the basis of a speed command.

In FIG. 1, a section constituted by the comparator 11, the OR gate 13, the sampling circuit 10, an internal circuit of the CPU 14 associated with the comparator 11 and the OR gate 13, and the like constitutes an output correction means for the rotary encoder 6.

Figure 16:
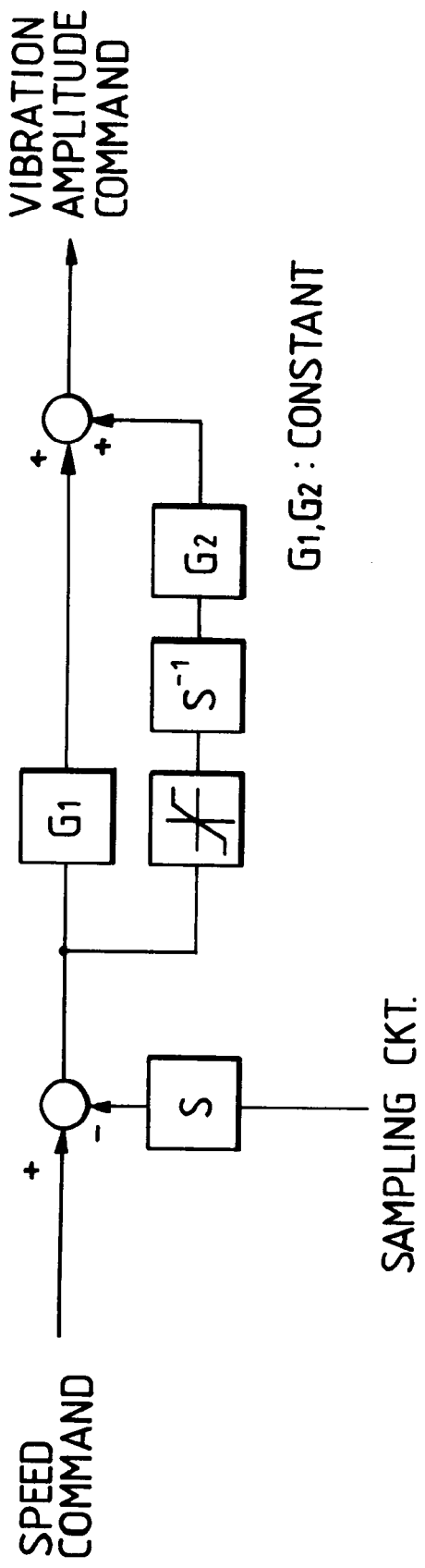
FIG. 16 is a block diagram showing an arrangement of a speed control unit.

FIG. 2 is a flow chart of a program executed in the CPU 14. An operation will be described below. First, the CPU 14 sets a vibration amplitude command (S) to be zero so as to instruct the sampling circuit 10 to execute sampling through the OR gate 13, and thereafter, receives the current position (the count value of the counter 9 at that time) (#1). When a speed command other than zero is input from a speed command apparatus (not shown), the CPU sets the vibration amplitude command (S) to be a maximum value ($S_{max}$) in step #3, and then enters a speed control routine forming a speed control loop. Thus, the speed is controlled until the speed command becomes zero. Note that the drive frequency voltages to A and B phases are increased as the command (S) has a larger value. In the speed control routine, the output pulses from the comparator 11 are received, and the leading edge of the pulse is detected a predetermined number of times N (N=1, 2, 3, . . . ) (#4). Thereafter, a sampling command is issued to the sampling circuit 10, and a count value $I_0$ of the counter 9 at that time is read. The previous count value is set as $I_1$, and a current speed V is calculated based on a difference ($I_0 - I_1$) between the two count values (#5). The command speed and the current speed V are then compared with each other. If the current speed V is lower than the command speed, the vibration amplitude command (S) is increased by a predetermined amount to increase the drive voltage values, thereby increasing the speed (#7 and #8). In this case, when the amplitude command S is equal to $S_{max}$, the flow advances to step #11 without executing step #8 since the speed can no longer be increased. If it is determined in step #6 that the current speed V is higher than the command speed, the amplitude command (S) is decreased by a predetermined amount in steps #9 and #10, thereby decreasing the speed. If speed control with still higher precision is to be performed, control may be made by a calculation based on a known control logic shown in the block diagram of FIG. 16.

Figure 4:
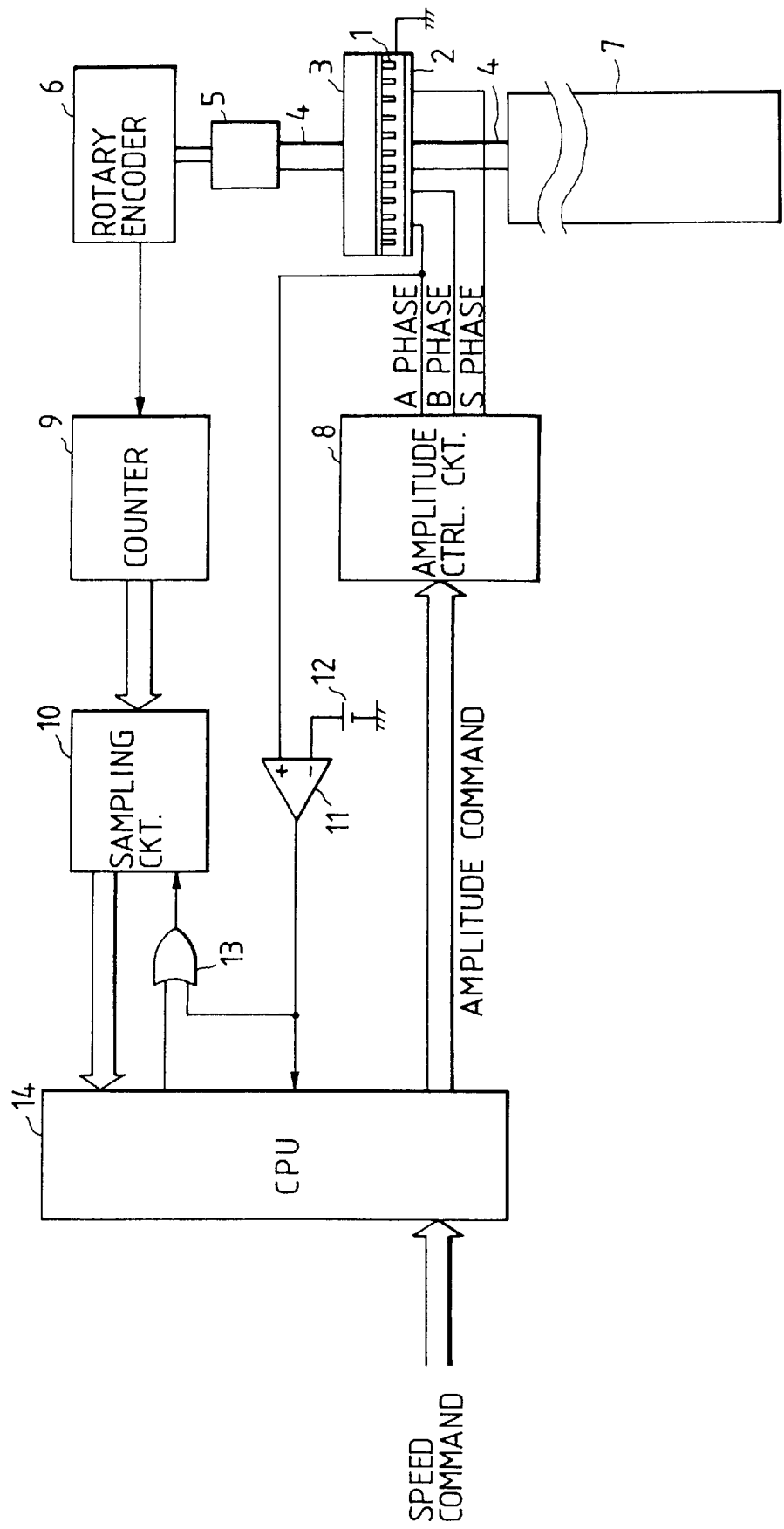
FIG. 4 is a diagram showing a modification of the embodiment shown in FIG. 1.

FIGS. 3A to 3E are charts for explaining the influence of the vibration actuator on the encoder 6, and the effect of the sampling circuit 10. FIG. 3A shows a sine wave output signal from the rotary encoder in a normal state. In FIG. 3A, output signal values at the respective timings represent position data, and these data appear as the count value of the counter 9. In FIGS. 3B and 3D, solid curves represent the output signal from the rotary encoder under the influence of the vibration of the vibration actuator, and dotted curves illustrate the same waveform as that in FIG. 3A. FIG. 3C shows a pulse signal synchronous with the vibration of the vibration actuator, i.e., an output signal from the comparator 11 shown in FIG. 1. More specifically, the signal S from the vibration detection electrode represents the vibration state. When a signal similar to a slight vibration signal represented by the solid curve in FIG. 3B is output, and is input to the comparator 11, the pulse signal shown in FIG. 3C is formed in synchronism with this vibration signal. FIG. 3E shows an arbitrary clock signal. In FIGS. 3B and 3D, alternate long and short dashed curves are defined by connecting detection positions when positions are detected by leading edges of the pulse signals shown in FIGS. 3C and 3E. In this case, the waveform shown in FIG. 3B, which is detected in synchronism with the vibration of the vibration actuator, shows a phase-shifted sine wave, and reveals that the speed can be precisely detected although there is a time lag. In other words, the data shown in FIG. 3A are almost precisely detected. On the other hand, the alternate long and short dashed curve shown in FIG. 3D, which is synchronized with the arbitrary clock signal, shows a distorted waveform, and reveals that the speed cannot be precisely detected. For the sake of descriptive convenience, a description has been made using a sine wave output encoder. The same effect as described above can be obtained for the same reasons as above when a pulse output encoder or an absolute output encoder is used. In this embodiment, a position is detected in synchronism with an S-phase signal as a vibration detection signal. However, as a matter of course, the position may be detected in synchronism with a pulse signal having the same frequency as the A or B phase and formed based on, e.g., a reference signal for generating the A or B phase as the vibration actuator drive signal or the A or B phase in the vibration amplitude control circuit 8. FIG. 4 shows a diagram used when the position is detected in synchronism with the A phase. In this modification, the amplitudes or frequencies of the A- and B-phase voltages are changed to change the vibration amplitude of the vibrating body 1, thus achieving speed control. However, a phase difference between the A and B phases may be changed to attain speed control. Furthermore, the rotational shaft of the vibration shaft may be externally braked to control the speed.

Figure 5:
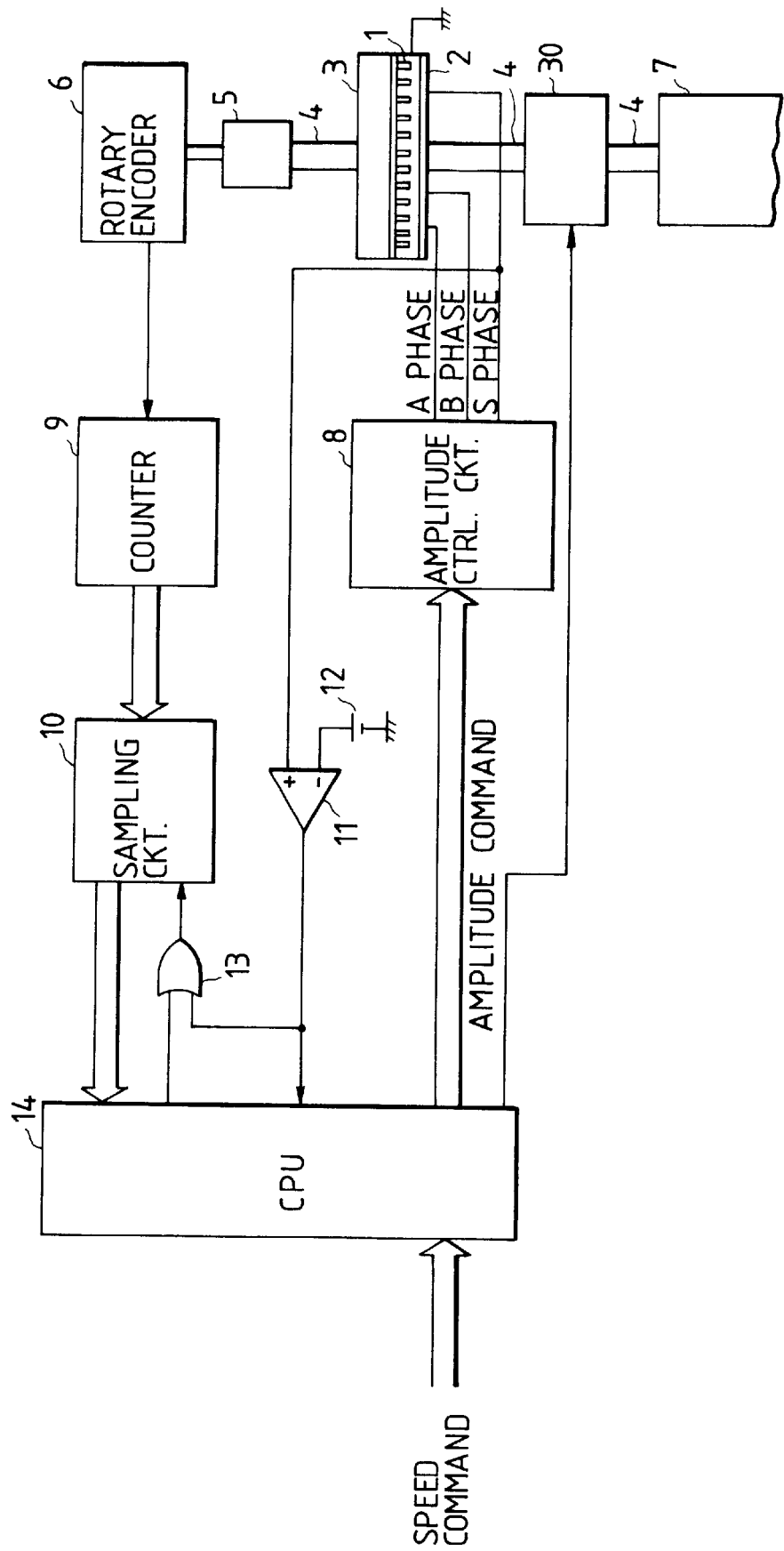
FIG. 5 is a diagram showing another modification of the embodiment shown in FIG. 1.

FIG. 5 shows a modification wherein speed control is made by changing a braking force by a brake device 30 attached to the shaft 4.

In each of the above modifications, the vibration amplitude control circuit 8 or the brake device 30 constitutes a speed adjustment means (or a speed change operation unit) for adjusting the speed of the actuator.

Figure 6:
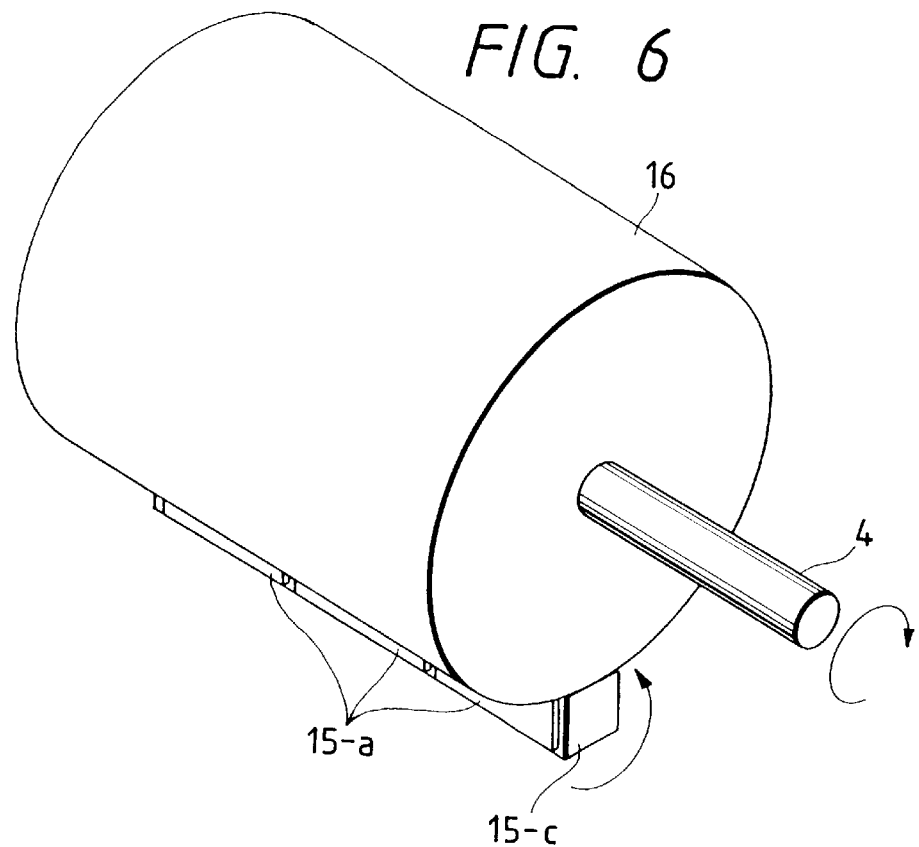
FIG. 6 is an enlarged perspective view of principal part of a vibration actuator having a rod-like vibrating body.
Figure 7A:
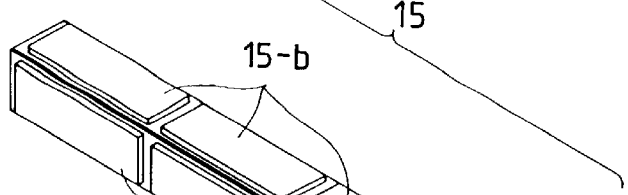
FIGS. 7A and 7B are enlarged perspective views of the rod-like vibrating body.
Figure 7B:
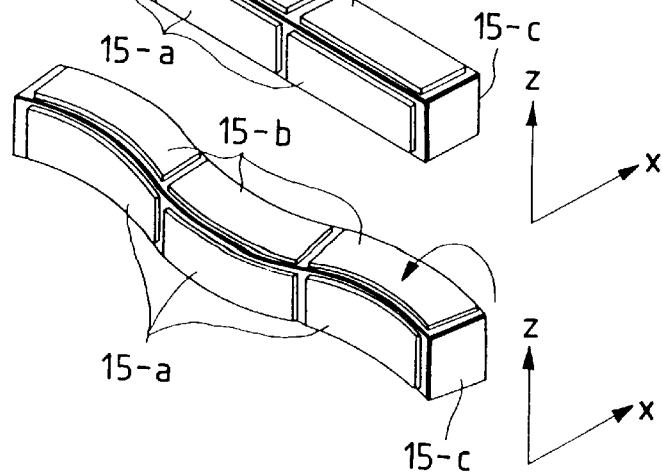
Figure 8:
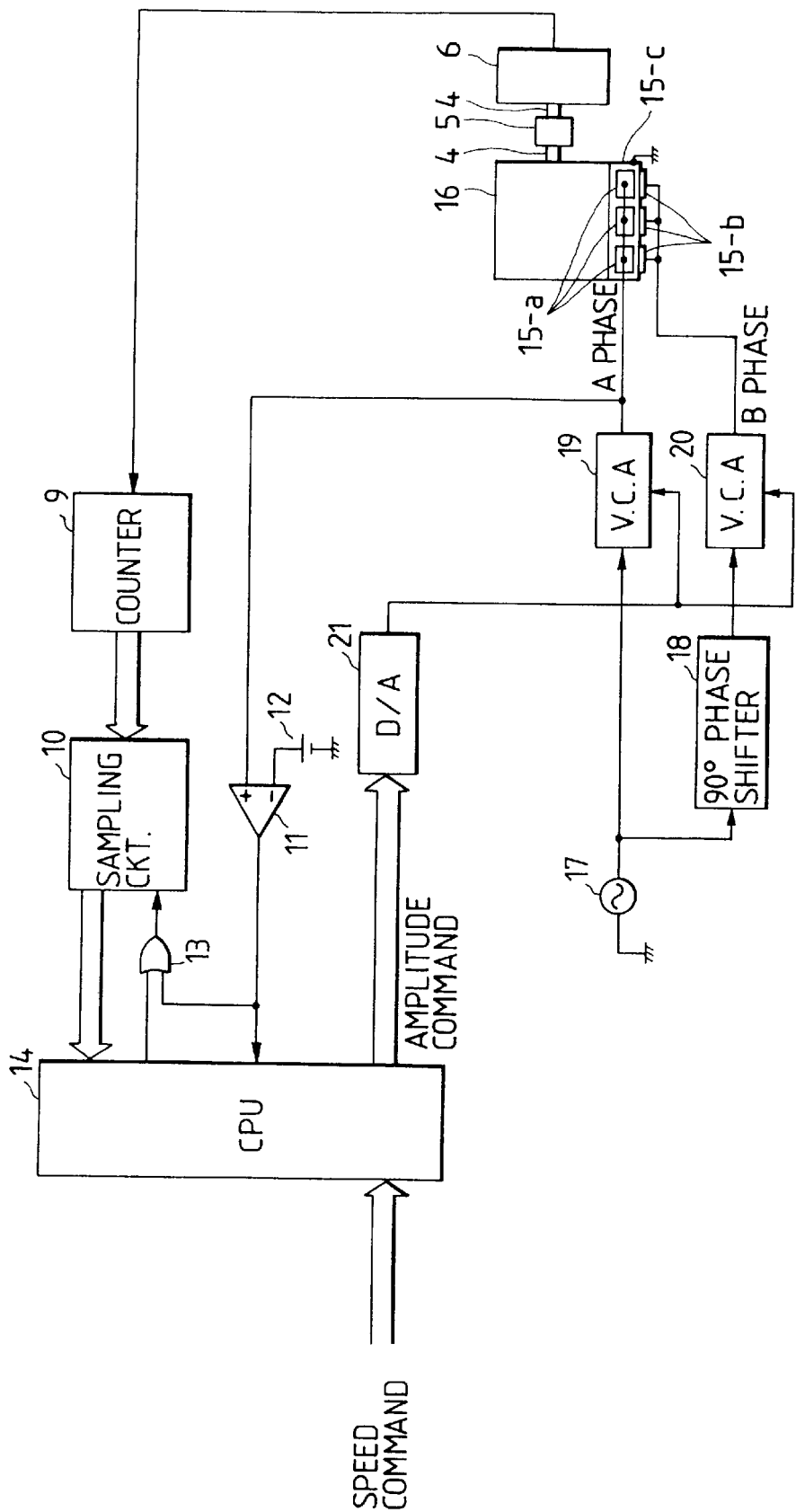
FIG. 8 is a diagram showing another embodiment of the present invention applied to the vibration actuator shown in FIG. 6.

In an embodiment shown in FIGS. 6 to 8, a moving body of an actuator is used commonly as a load, and a roller 16 as a rotor of the vibration actuator serves as a driven roller as a load. A plurality of sets of rod-like vibrating bodies 15-*a* to 15-*c* shown in FIG. 7A are urged against the outer circumferential surface of the roller 16. Upon flexural vibration of these vibrating bodies, the roller 16 is rotated.

The operation principle of the actuator of this embodiment will be described hereinafter with reference to FIGS. 6 to 7B. A rod-like vibrating body 15 is constituted by an electro-mechanical energy conversion element 15-*a* used for vibration in the X-axis direction, an electro-mechanical energy conversion element 15-*b* used for vibration in the Z-axis direction, and a metal square rod 15-*c*. When an AC voltage having a frequency in a third order natural vibration mode of the square rod 15-*c* is applied to the electro-mechanical energy conversion element 15-*a*, the vibrating body vibrates in the X-axis direction, as shown in FIG. 7B. Furthermore, when an AC voltage, which has the frequency in the third order natural vibration mode, and has a 90° phase difference over time from the AC voltage to be applied to the electro-mechanical energy conversion element 15-*a*, is applied to the electro-mechanical energy conversion element 15-*b*, the rod-like vibrating body 15 undergoes a circular motion, as indicated by an arrow in FIG. 7B. Thus, when the rod-like vibrating body 15 is brought into contact with the roller 16 under pressure, as shown in FIG. 6, the roller 16 can be rotated by a frictional force in a direction opposite to the rotational direction of the vibration of the rod-like vibrating body, as indicated by an arrow in FIG. 6.

FIG. 8 is a block diagram showing a control apparatus for controlling the rotational speed of the actuator of this embodiment. This control apparatus includes an oscillator 17 for generating an AC signal having a frequency in the third order natural vibration mode of the rod-like vibrating body 15, a 90° phase shifter 18 for shifting the phase of the AC signal by 90°, known voltage controlled amplifiers (V.C.As) 19 and 20 for changing the amplitudes of input signals in response to a signal from a D/A converter (to be described later), and outputting the amplitude-changed signals, and a D/A converter 21 for converting an application voltage amplitude command from a digital signal into an analog signal. If the current speed is lower than a speed command, an amplitude command instructs the D/A converter to increase the amplitude, and the V.C.As 19 and 20 increase the amplitudes of the AC voltages to be applied to the electro-mechanical energy conversion elements 15-*a* and 15-*b* of the rod-like vibrating body 15. As a result, since the vibration amplitude of the rod-like vibrating body 15 is increased, the rotational speed of the roller 16 is increased, thereby controlling the rotational speed to that indicated by the speed command. In this actuator, the speed can be detected in synchronism with an application voltage, so that speed detection free from the influence of the vibration can be performed, and high-precision speed control can be attained like in the first embodiment. In this embodiment, an encoder output is sampled in synchronism with an application voltage. However, the encoder output may be sampled in synchronism with the output signal from the oscillator 17.

Figure 9:
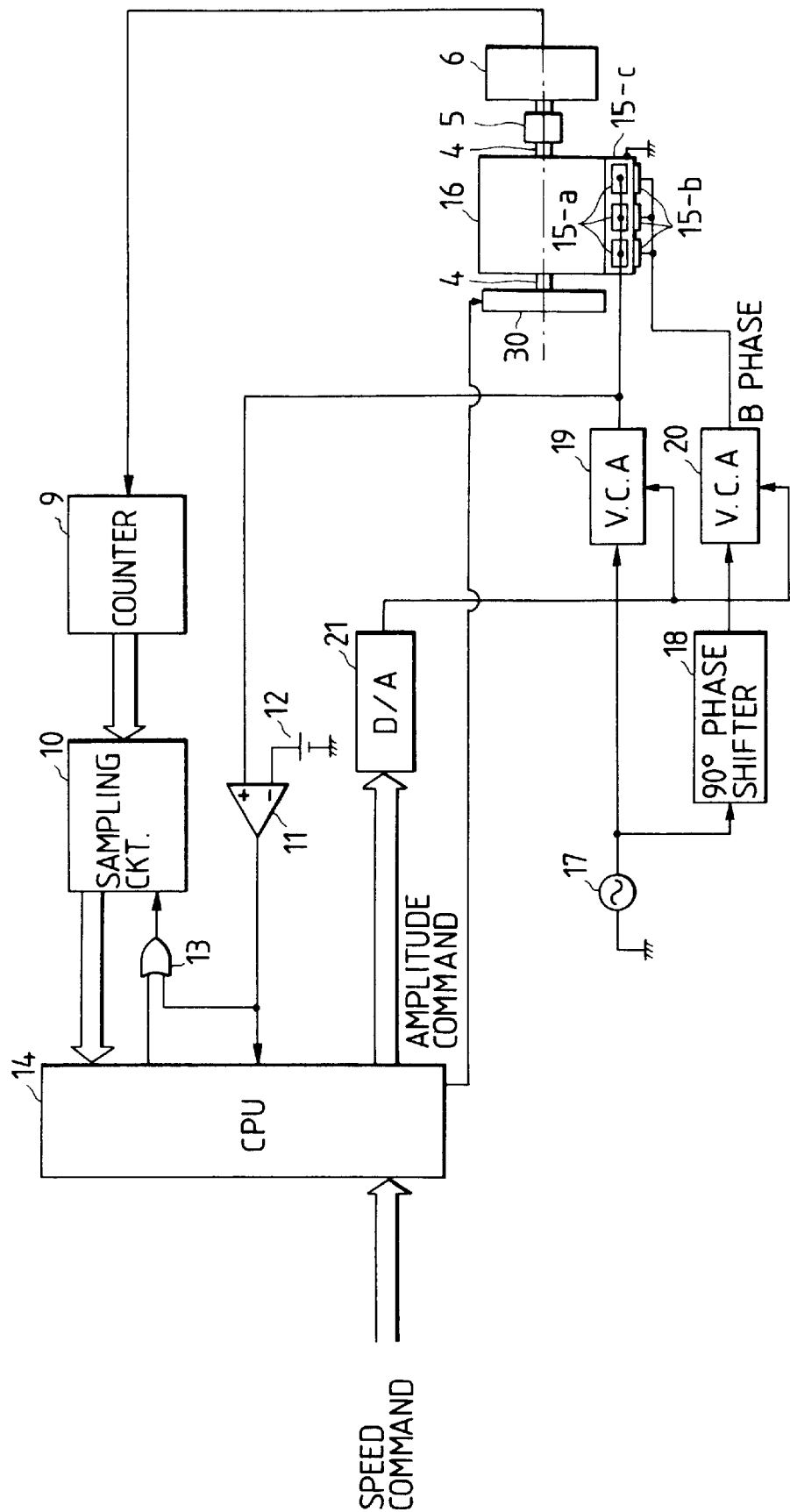
FIG. 9 is a diagram showing a modification of the embodiment shown in FIG. 8.

FIG. 9 shows a modification of the embodiment shown in FIG. 8. In this modification, the vibration of the rod-like vibrating body 15 is controlled in the same manner as in the embodiment shown in FIG. 8, and the rotational speed of the shaft 4 is directly controlled by controlling a brake device 30 attached to the shaft 4.

Figure 10:
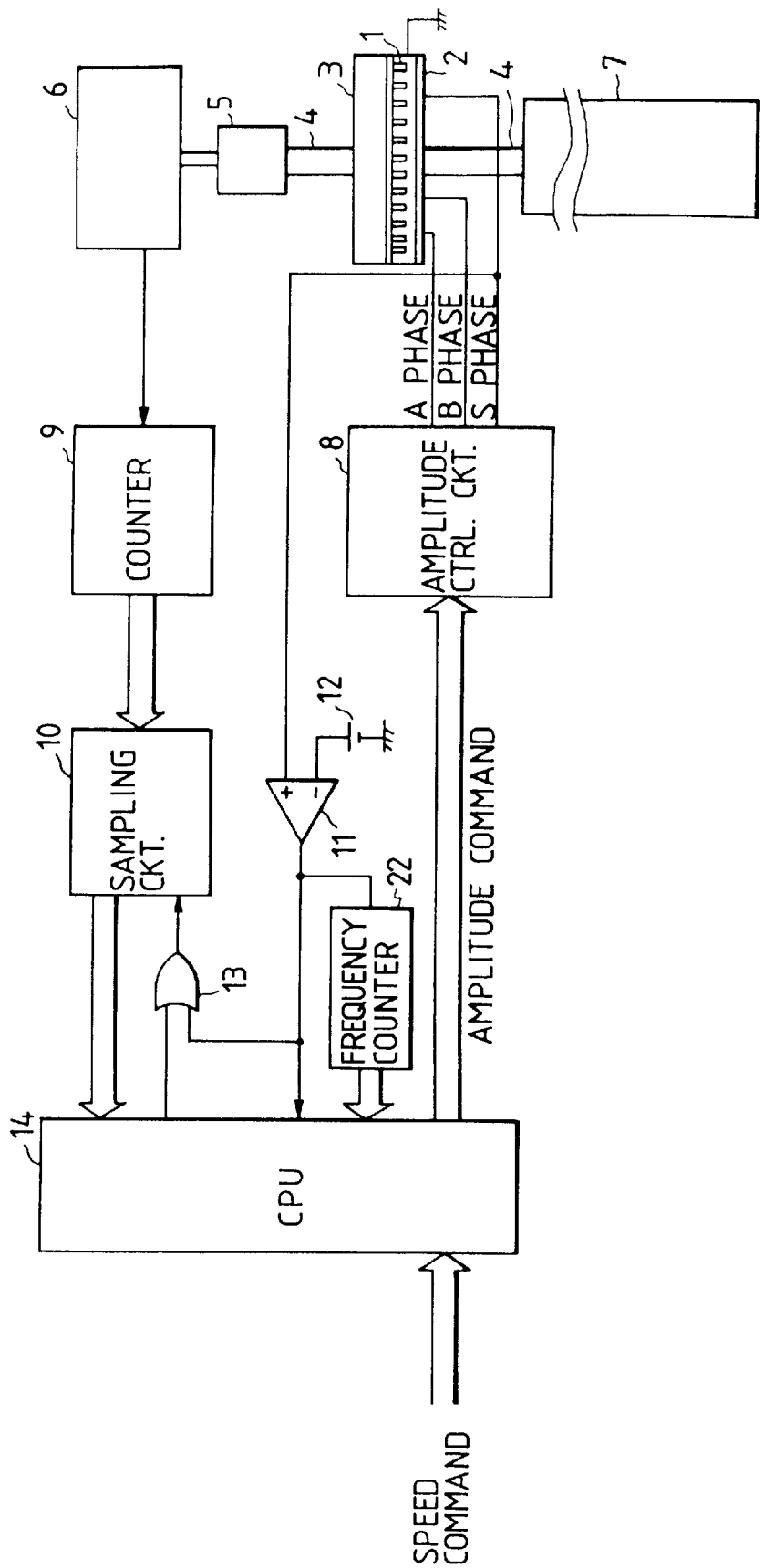
FIG. 10 is a diagram showing still another embodiment of the present invention.

FIG. 10 shows an embodiment wherein the precision of the speed control apparatus of the embodiment shown in FIG. 1 is further improved. Note that the first embodiment has the following problems.

That is, in the first embodiment, when the speed is controlled by changing the frequency of an application voltage, or when the vibration amplitude control circuit 8 is arranged to automatically follow a change in natural frequency of the vibrating body 1, since the sampling period of position data changes, there is a risk of variation in the detected speed by about several to 10%.

The embodiment shown in FIG. 10 can perfectly remove the above-mentioned risk. A difference from the embodiment shown in FIG. 1 is that a frequency counter 22 is added. The counter 22 counts a frequency, at which the leading edge of a signal from the comparator 11 appears, on the basis of an interval between the leading edges.

Figure 11:
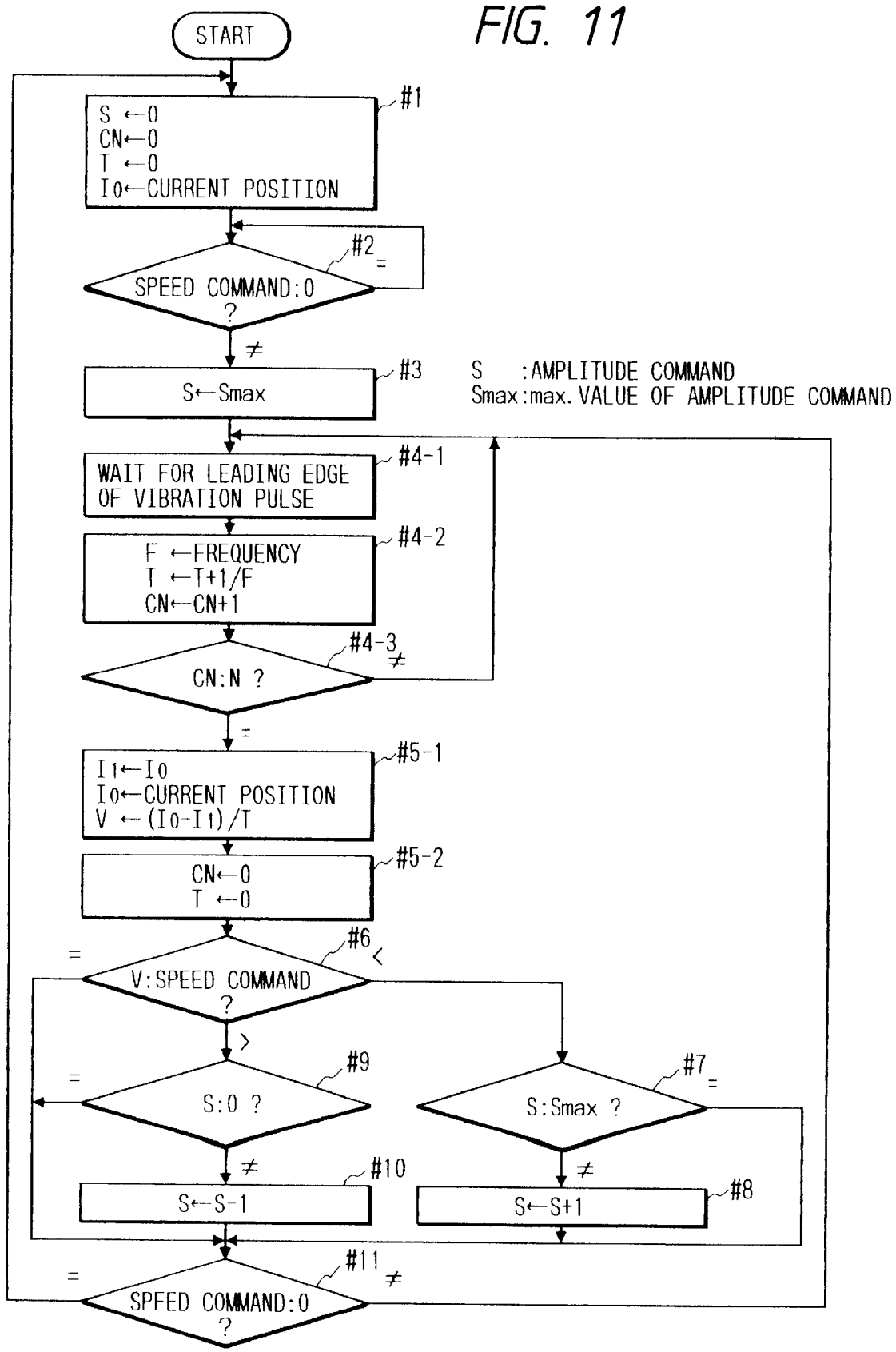
FIG. 11 is a flow chart showing a control operation executed by a microcomputer included in the apparatus shown in FIG. 10.

FIG. 11 is a flow chart showing an operation of the CPU 14 in the arrangement shown in FIG. 10. Since a speed detected in this embodiment can be expressed as a moving amount in unit time, a displacement amount can be divided by the time required for the displacement to obtain speed data. More specifically, a moving amount during detection of N (N=1, 2, 3, . . . ) leading edges of vibration pulses can be divided by the accumulated value of pulse periods, thereby detecting a precise average speed. In the flow shown in FIG. 11, control is made based on this principle.

The operation will be described below with reference to the flow chart shown in FIG. 11.

In step #1, the amplitude command is set to be zero, variables CN and T are set to be zero, and the count value of the counter 9 is set in $I_0$. In step #2, it is checked if the speed command is input. If it is determined that the speed command is input, the amplitude command is set to be a maximum value $S_{max}$ in step #3. In this state, a pulse input from the comparator 11 is detected (#4-1). When the pulse input is detected, the variable CN is incremented by one, the frequency detected by the frequency counter 22 is input to a variable F, and the variable T is incremented by 1/F in step #4-2. Thereafter, it is checked in step #4-3 if the value of the variable CN has reached a predetermined value N. If it is determined that the variable CN has not reached N yet, steps #4-1 to #4-3 are repeated. In step #5-1, the previous counter value $I_0$ is set in $I_1$, the current count value of the counter 9 is set in $I_0$, and $(I_0-I_1)/T$ is set as V. $I_0-I_1$ represents a moving amount of the encoder 6 during a time period required until the variable CN reaches N, and T represents the time period required until the variable CN reaches N. As a result, V represents the moving speed. In step #5-2, the variables CN and T are set to be zero, and thereafter, speed control based on the moving speed V is executed in steps #6 to #11 in the same manner as in FIG. 2. As a method of obtaining T, a time period until CN reaches N may be counted by an internal timer of the CPU.

Figure 12:
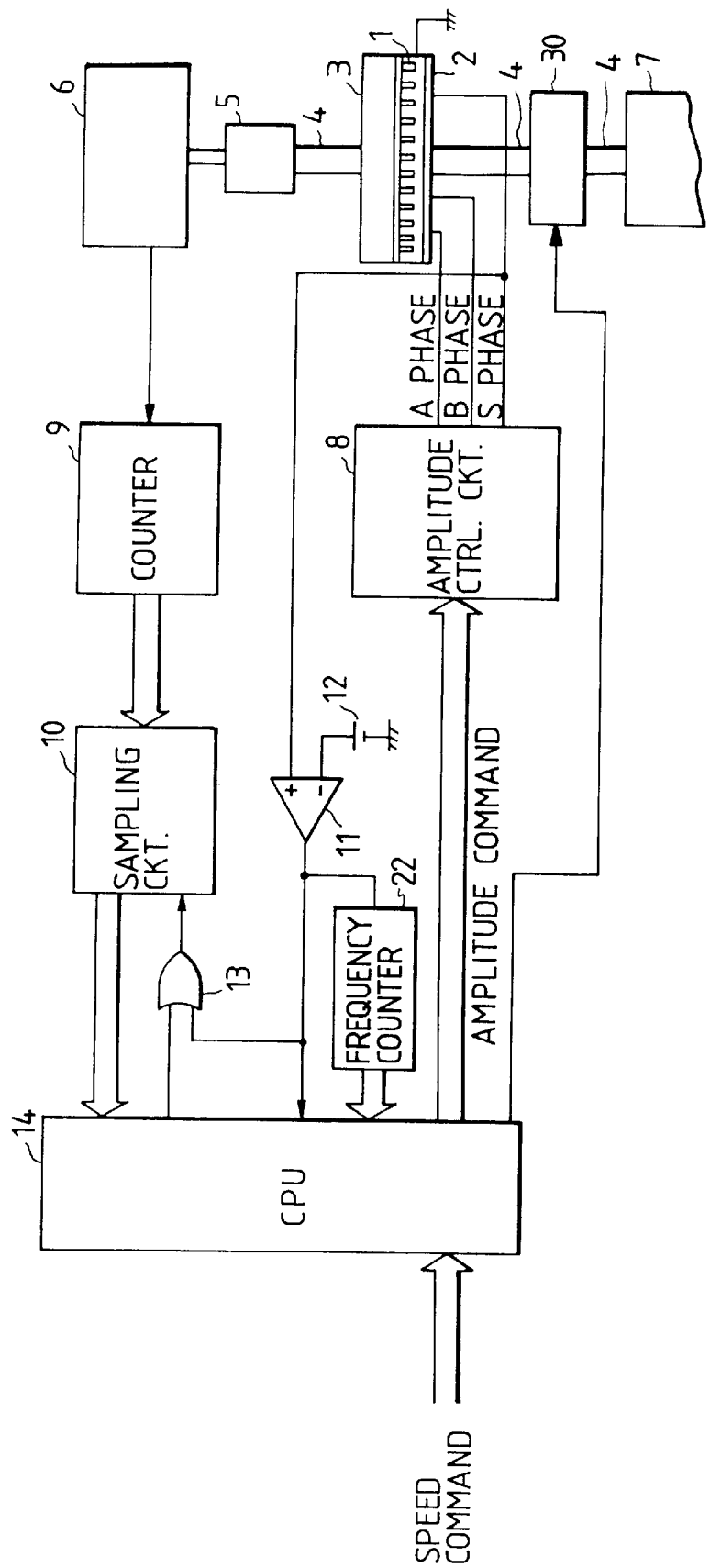
FIG. 12 is a diagram showing a modification of the embodiment shown in FIG. 10.

FIG. 12 shows a modification of the embodiment shown in FIG. 10. In this modification, a braking force of the brake device 30 attached to the shaft 4 is controlled to directly perform speed control of the load 7.

Figure 13:
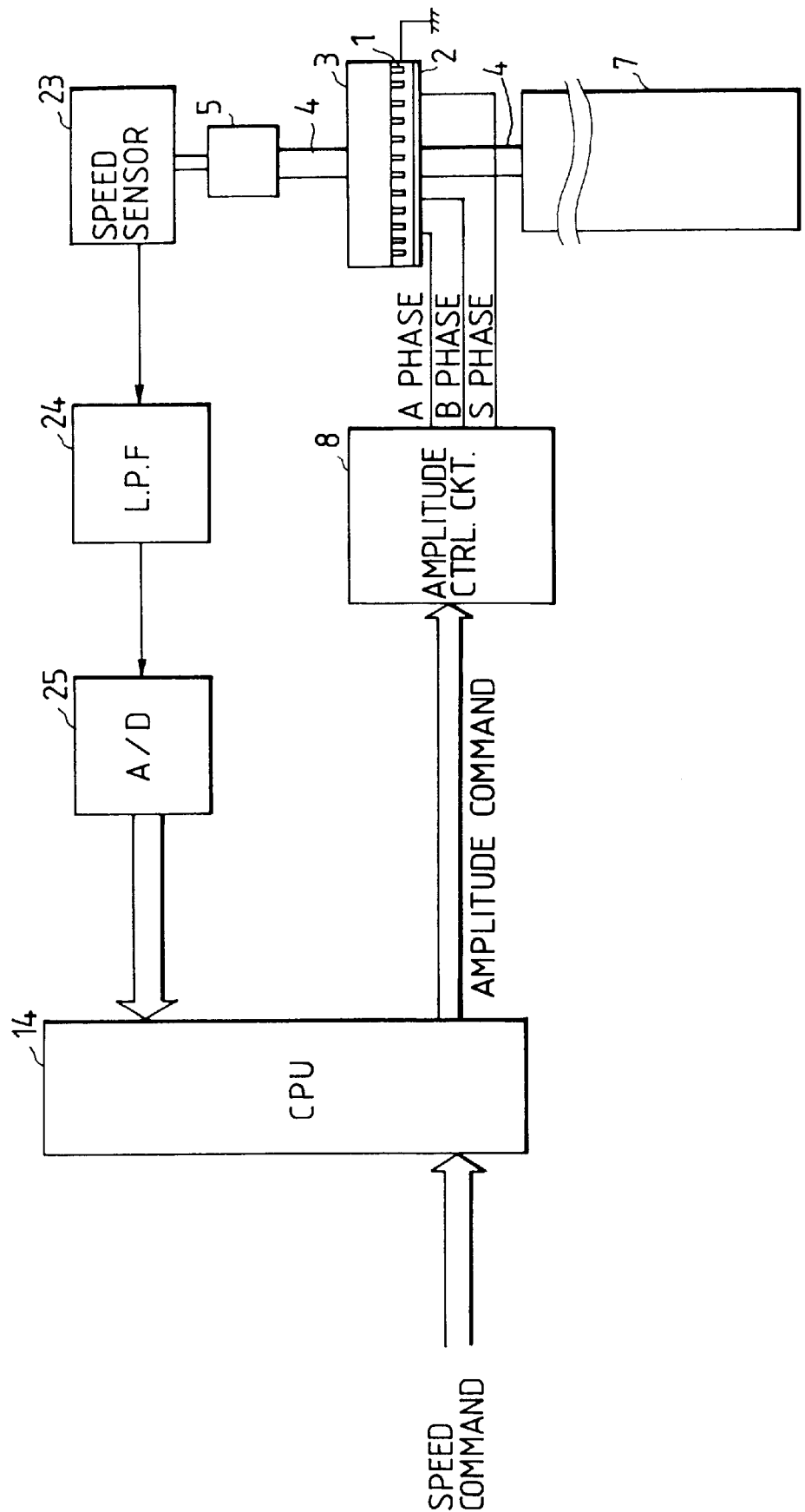
FIG. 13 is a diagram showing still another embodiment of the present invention.

FIG. 13 shows an embodiment wherein an analog speed sensor such as a tachometer generator 23 is used as a speed detection means, and a low-pass filter (LPF) 24 is used as an output correction means. The filtering band of the LPF 24 is designed to remove the vibration frequency component of the vibrating body 1. A known A/D converter 25 converts an analog signal into a digital signal, and inputs the digital signal to the CPU 14. The CPU 14 generates a speed control signal (amplitude command) for controlling the vibration amplitude control circuit 8 while comparing the input data from the A/D converter 25 with the speed command. The vibrating body 1 vibrates on the basis of the amplitude command.

Figure 14:
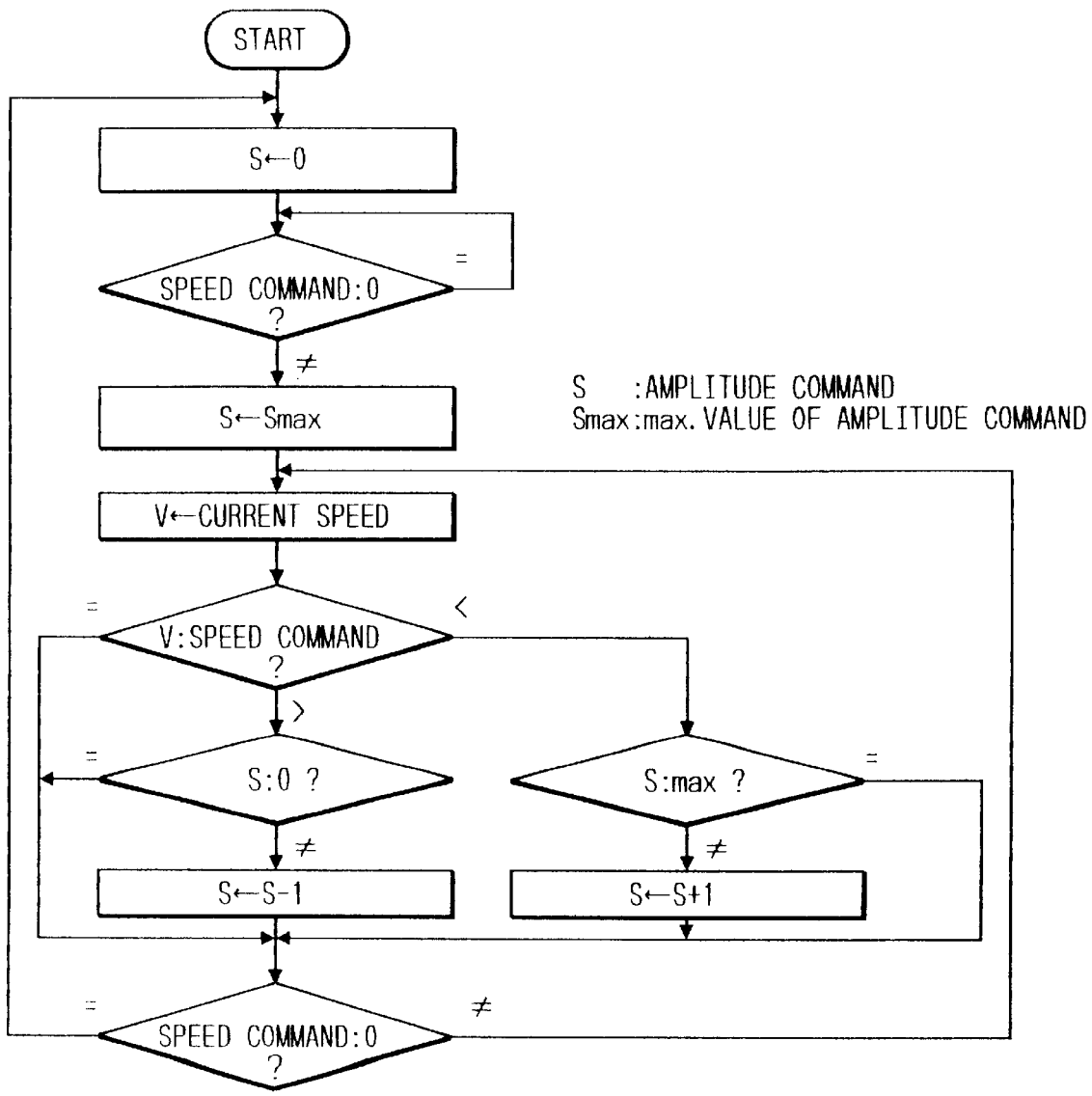
FIG. 14 is a flow chart showing a control operation of a microcomputer included in the apparatus shown in FIG. 13.

FIG. 14 is a flow chart showing a control operation executed by the CPU 14 in the speed control apparatus shown in FIG. 13.

Figure 15:
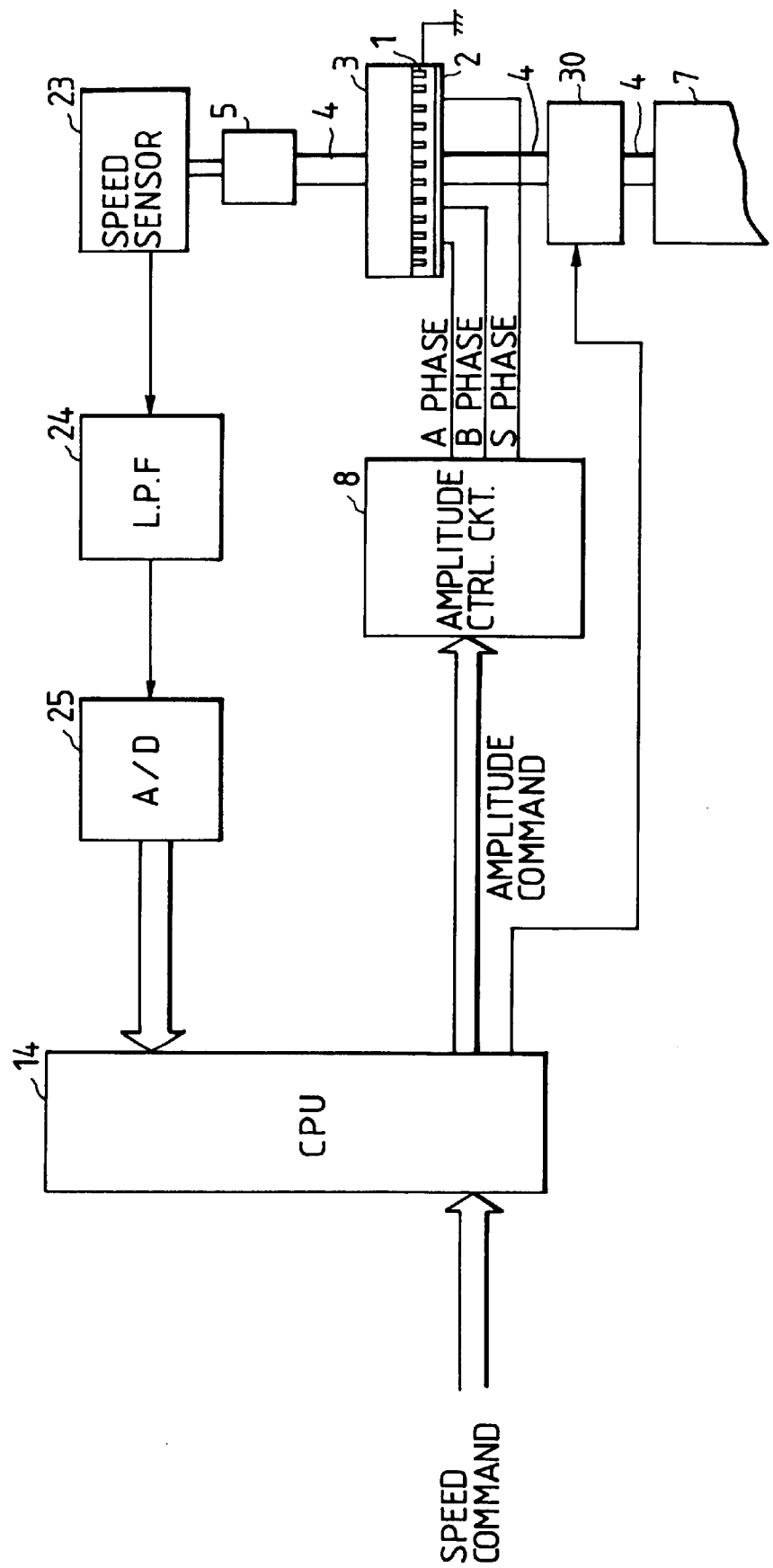
FIG. 15 is a diagram showing a modification of the apparatus shown in FIG. 13.

FIG. 15 shows a modification of the embodiment shown in FIG. 13. In this modification, the rotational speed of the shaft 4 is directly controlled by a brake device 30 attached to the shaft 4.

As another modification of FIG. 13, a rotary encoder may be used in place of the tachometer generator 23, and a digital filter may be used in place of the LPF 24. In this case, the A/D converter 25 can be omitted, and the arrangement can be simplified as compared to that of FIG. 13.

Figure 17:
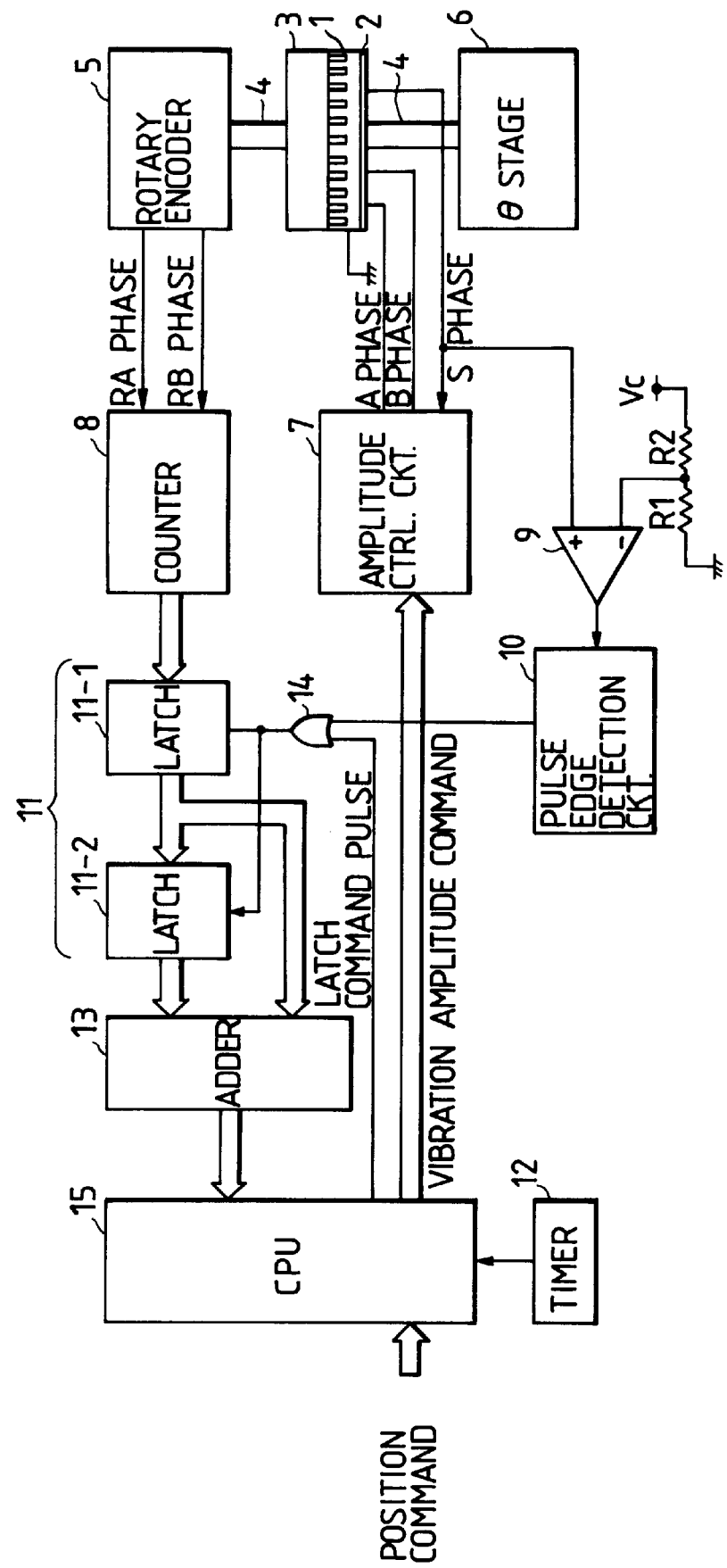
FIG. 17 is a schematic diagram of a position control apparatus according to still another embodiment of the present invention.

FIG. 17 is a block diagram showing still another embodiment of the present invention. This embodiment provides a θ-stage position control circuit for performing a high-precision aligning operation using a vibration actuator for generating a travelling vibration wave on a ring-like vibrating body, and rotating a rotor by a frictional force.

The circuit shown in FIG. 17 includes a vibrating body 1, a piezo-electric element 2, a rotor 3, and a rotating shaft 4. The piezo-electric element 2 generates two standing waves having the same frequency in the vibrating body 1 to generate a travelling wave upon synthesis of the two waves. The piezo-electric element 2 has a vibration detection electrode, and generates an S-phase signal corresponding to the vibration of the vibrating body 1. The rotor 3 is in contact with the upper surface (FIG. 17) of the vibrating body 1 under pressure, and is rotated by a frictional force. The circuit shown in FIG. 17 also includes a rotary encoder 5, and a θ stage 6. The circuit further includes a vibration amplitude control circuit 7 for controlling the vibration amplitude of the vibrating body 1 by changing the voltage amplitudes or frequencies of A and B phases, a counter 8 for receiving two phase signals, i.e., RA- and RB-phase signals having a 90° positional phase difference therebetween from the rotary encoder, and detecting a rotational angle, a comparator 9, and a pulse edge detection circuit 10. The S-phase signal as an almost sine wave signal formed in correspondence with the vibration of the vibrating body 1 is converted by the comparator 9 into a square wave of a duty of about 50%, and the pulse edge detection circuit 10 generates a pulse sufficiently shorter than the pulse width of the square wave in synchronism with the positive and negative edges of the square wave. Since R1<<R2, and Vc is a positive voltage, when the vibration is stopped, the S-phase signal becomes 0 V and the output from the comparator 9 also becomes 0 V.

Figure 18:
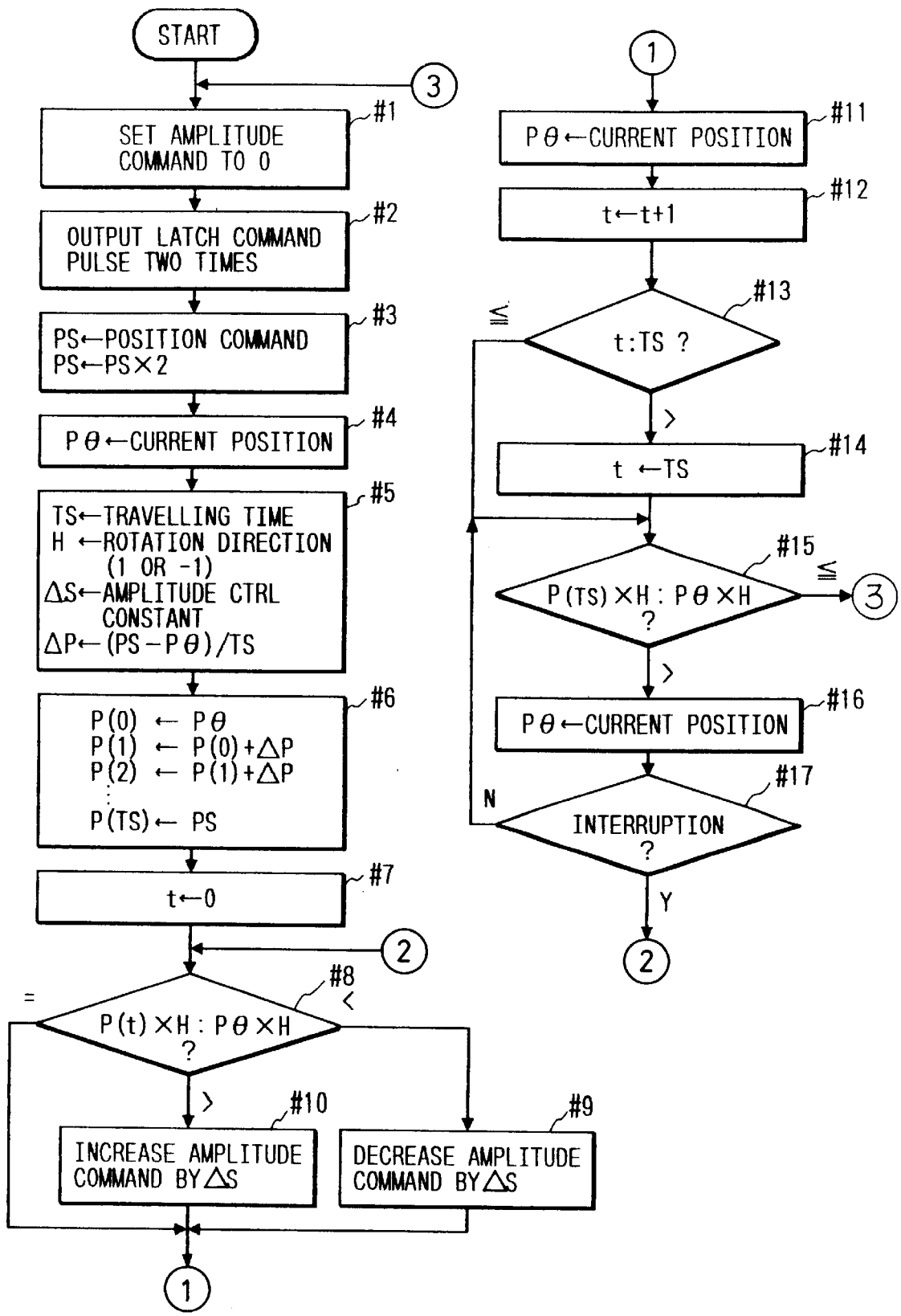
FIG. 18 is a flow chart of a control operation of a CPU 15 shown in FIG. 17.

The circuit shown in FIG. 17 further includes known latches 11, a known digital adder (to be referred to as an adder hereinafter) 13, a known OR gate 14, a CPU 15, and a timer 12. FIG. 18 is a flow chart showing an operation of the CPU 15. A detailed description will be made hereinafter with reference to FIG. 18. The effect of position detection in synchronism with the vibration will be briefly described below. Assume that the vibration amplitude of the vibrating body 1 is too small to rotate the rotor 3. Thus, the rotary encoder 5 is slightly vibrated, and its output signal oscillates to have a given value as the center. In addition, the output from the counter 8 for detecting and counting the output signal from the encoder 5 begins to oscillate at the vibration frequency of the vibrating body 1 to have a given count value as the center. If the output from the counter 8 is read by the CPU 15 at an arbitrary timing, it is difficult to detect the central value of the count. However, if a count value is read twice in synchronism with the positive and negative edges of the vibration of the vibrating body 1, and the two count values are averaged, since values shifted by $+\Delta$ and $-\Delta$ from the central value of the count can be averaged, the central value of the count can be detected. For this reason, a position very close to a true position can be detected in position control, thereby improving stop position precision.

Since the CPU 15 initially sets the vibration amplitude command to be zero (#1), the AC voltage outputs of the A and B phases of the vibration amplitude control circuit 7 are zero. Thus, the vibrating body 1 does not vibrate, and the rotor 3 stands still. In addition, the output from the counter 8 indicates a previous stop position. The outputs from the latches 11-1 and 11-2 indicate the same value as the output value from the counter 8 due to a latch command pulse (#2), and the output from the adder 13 is twice the output value from the counter 8. Since the latch command pulse is output twice in step #2, the latches 11-1 and 11-2 indicate the output from the counter 8 at that time, and the output from the adder 13 is twice the output value from the counter 8.

When the next position command (data representing a target position) PS is input from a position command apparatus (not shown), the position command PS is doubled, and is set in a variable PS (#3) ("variable" will be omitted hereinafter) in place of halving the output (to be referred to as a current position hereinafter) from the adder 13 indicating a value twice the current position.

The output (current position×2) from the adder 13 is set in Pθ (#4), and a proper moving time (TS), and an amplitude control constant ($\Delta S$) are determined and set with reference to, e.g., a predetermined data table on the basis of the difference between PS and Pθ. In addition, 1 or −1 is set in H in accordance with the rotational direction, and a target rotational angle in a unit time is input to $\Delta P$ on the basis of PS, Pθ, and TS (#5).

Then, target positions at respective times, i.e., Pθ at time t=0 to PS at time t=TS, are set in an array from P(0) to P(TS) (#6). Then, 0 is set in t (#7), thereby starting the position control operation.

In step #8, P(0) is compared with Pθ. Assume that H is set to be +1. Since P(0)=Pθ, the output from the adder 13 is set in Pθ again in step #11. In step #12, t=t+1, and in step #13, t is compared with TS. In this case, t=1 since t+1 is executed for the first time in step #12, and t<TS. Therefore, the flow advances to step #15. In step #15, P(TS) is compared with Pθ. Since P(TS)>Pθ, the flow advances to step #16, and the output from the adder 13 is set in PO again. In step #17, an interruption by the timer 12 at a predetermined time interval is awaited. When an interruption occurs, the flow advances to step #8. Steps #8 to #16 are repeated every time a timer interruption occurs. In step #8, the target position P(t) at that time is compared with the current position Pθ at that time, and if it is determined that the current position has not reached the target position, step #10 is executed to increase the amplitude (the amplitude of the drive signal voltage) by ΔS, thereby increasing the speed. On the other hand, if it is determined that the current position has exceeded the target position, step #9 is executed to decrease the amplitude by ΔS, thus decreasing the speed. In this manner, speed control is made so that the target position PS is reached after an elapse of the time TS.

Since steps #13 to #16 are executed upon every interruption, it can be determined whether or not the current position Pθ has reached the target position PS. When the current position Pθ reaches the target position PS, the flow returns to step #1. Thus, the drive operation is stopped, and the actuator is stopped. In the above-mentioned control, a value set in Pθ corresponds to the value of the counter 8 at an edge detection timing from the edge detection circuit 10. Since the edge detection is performed in synchronism with the positive and negative edges of the vibration in correspondence with the vibration of the vibrating body, as described above, the count value at, e.g., the positive edge of the vibration of the counter 8 is latched by the latch 11-2, and the count value at the negative edge of the vibration is latched by the latch 11-1. Therefore, the current position data from the adder 13 is equal to a sum of values at the positive and negative edges of the vibration, and is processed as an average value. Therefore, the current position can be detected and processed as position data from which the influence of the vibration is removed.

In this embodiment, sampling and addition are executed in a hardware manner. However, the CPU 15 may detect pulse edges to read output values of the counter 8, and may add the read values. If the vibration frequency of the vibrating body 1 is higher than 5 or more times the output pulse frequency of the rotary encoder 5, the RA- and RB-phase signals may be filtered through a low-pass filter to remove the vibration frequency component. In this embodiment, a rotary type motor employing the ring-like vibrating body has been exemplified. However, position detection free from the influence of vibrations can be made in various other types of known vibration wave (ultrasonic) motors (actuators), such as linear and rotary types. In this embodiment, position detection is executed in synchronism with the S phase, but it may be executed in synchronism with a drive voltage.

Figure 19:
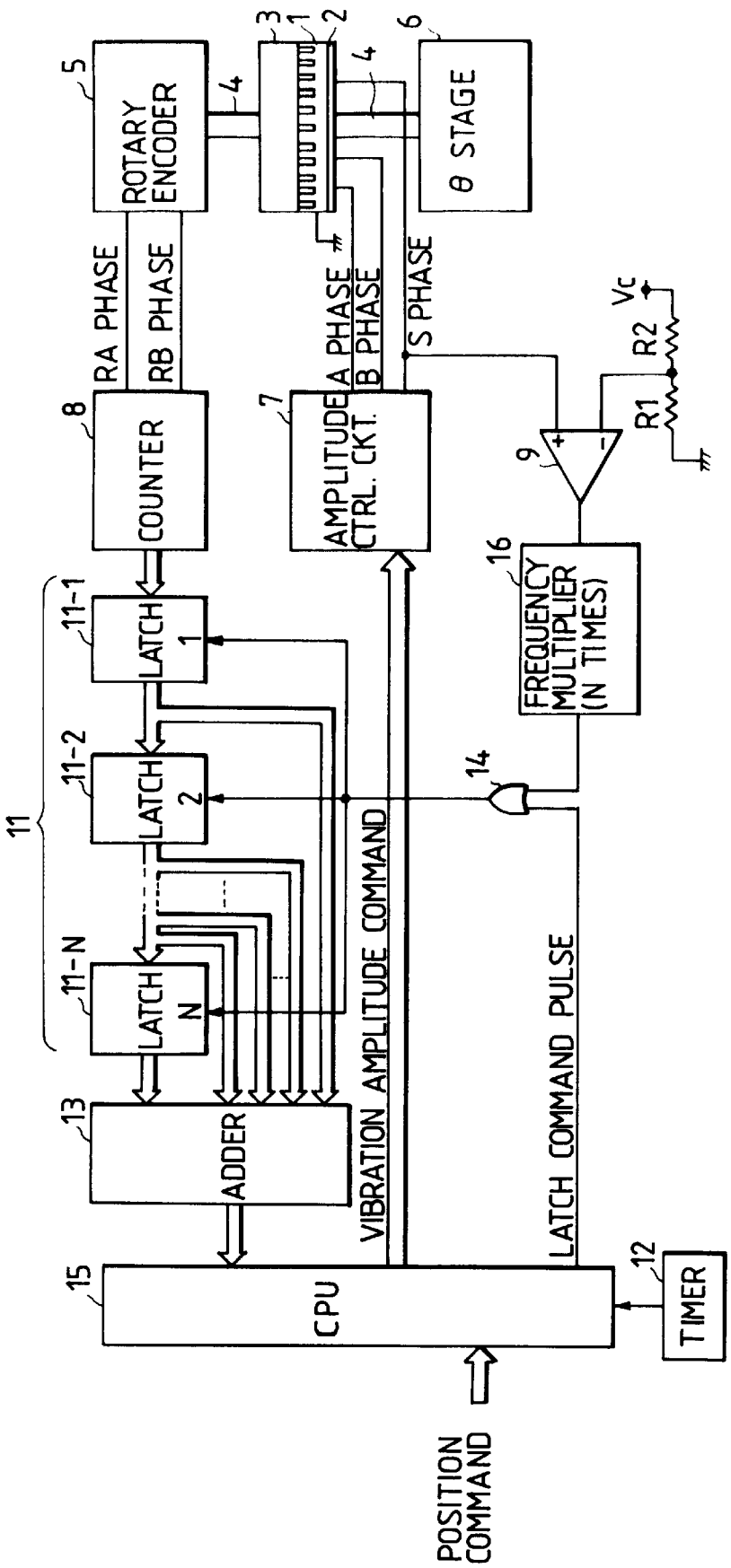
FIG. 19 is a schematic diagram of a position control apparatus according to still another embodiment of the present invention.

FIG. 19 is a block diagram showing still another embodiment of the present invention.

Figure 20:
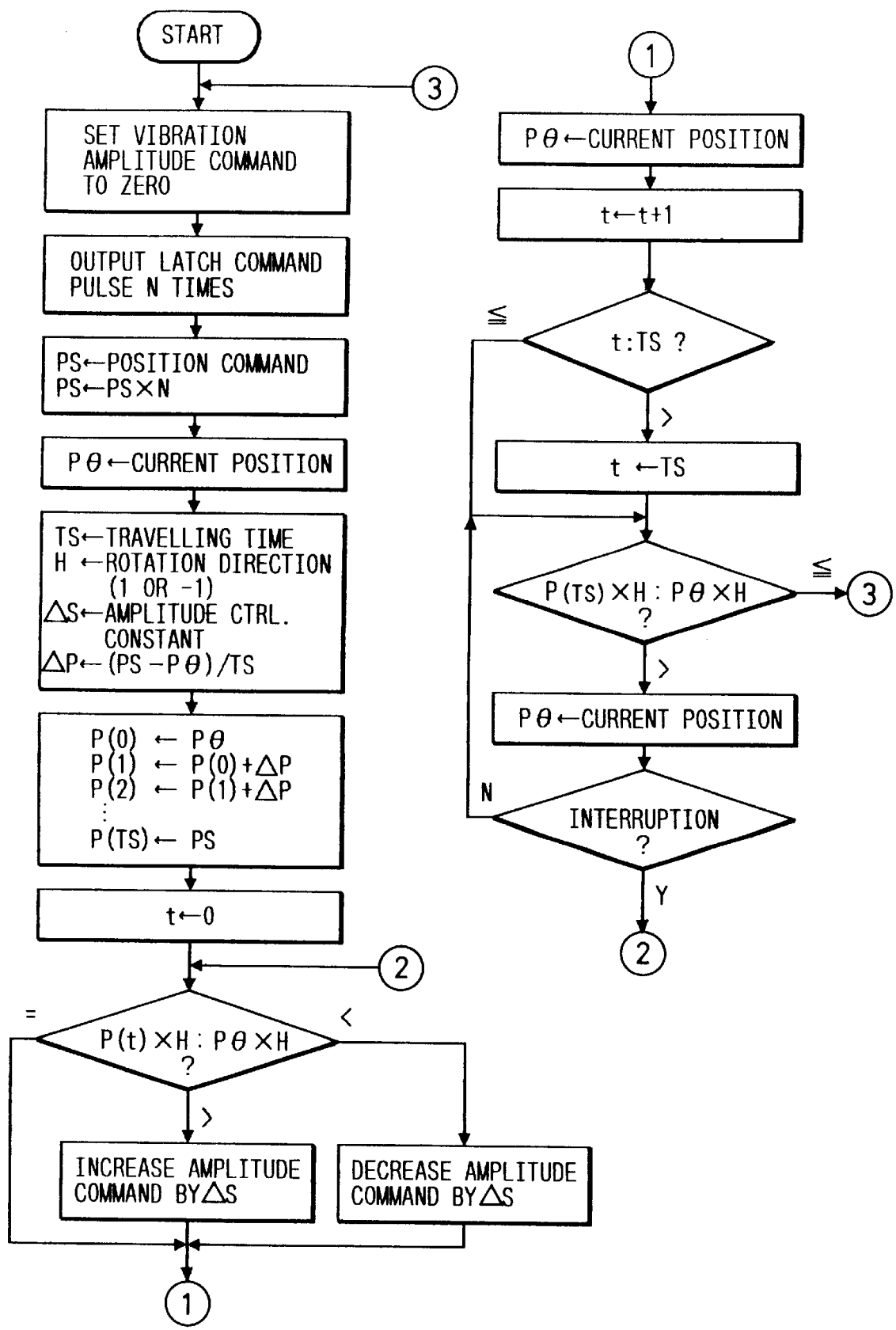
FIG. 20 is a flow chart of a control operation of a CPU 15 shown in FIG. 19.

A difference from the embodiment shown in FIG. 17 is that the number of latches 11 is increased, and an N-time frequency multiplier 16 generates a latch signal for the latches 11 in place of the pulse edge detection circuit 10. In this case, the output value from the counter 8 is sampled N times at a frequency N times the vibration frequency, and the sampling values are added and averaged, thereby averaging count values for one vibration period of the vibrating body. Therefore, the vibration center of the count value can be detected. FIG. 20 is a flow chart showing an operation of the CPU 15 of this embodiment.

In the embodiment shown in FIGS. 17 and 18, the latch command pulse is output twice, while in this embodiment, the latch command pulse is output N times. On the other hand, in the above embodiment, the position command is doubled, while in this embodiment, the position command is multiplied by N. Since other arrangements are the same as those in the embodiment shown in FIGS. 17 and 18, a detailed description thereof will be omitted. In this manner, position detection can be performed at higher speed. By utilizing the vibration in this manner, even when an encoder for outputting a small number of pulses is used, it can be detected that the current position comes close to the command position before the vibration center reaches the command position. Therefore, when the vibration of the vibrating body 1 is stopped at a position where the ratio of a case wherein the count value indicates the command position to a case wherein the count value indicates a position corresponding to an immediately preceding count becomes 50%, the vibrating body 1 is stopped at a position just corresponding to a boundary between the command position and the position corresponding to an immediately preceding count. In this embodiment, in order to stop the vibrating body at the boundary of counts, the command position must be shifted backward by 0.5 count. Furthermore, if N is an odd number, a fraction of 0.5 count is obtained when the CPU 15 multiplies the command position by N. At that time, the command position×N must be rounded in the rotational direction.

Like in FIGS. 17 to 20, position data for one vibration period can be added and averaged to minimize the influence of the vibration. A value, which can be actually detected, is given by the following equation. A detection position S is expressed by:

$$S = v_0 \cdot t + S_0 + S_S \cdot \cos(\omega_S \cdot t + \psi_0)$$

$$\left[ \begin{array}{l} t: \text{time}, v_0: \text{moving speed}, S_0: \text{initial position} \\ S_S: \text{amplitude of change in position by vibration} \\ \omega_S: \text{vibration angular frequency}, \psi_0: \text{initial} \\ \text{phase of vibration} \end{array} \right]$$

If one vibration period is equally divided into N sections, positions are represented by S(0), S(1), ..., S(N) in correspondence with the N sections, time points are represented by T(0), T(1), ..., T(N) in correspondence therewith, and one period is represented by $T_S$, an average $\overline{S}$ for one period is given by:

$$\overline{S} = \frac{1}{N} \sum_{n=0}^{N-1} S(n)$$

$$= v_0 \cdot t + S_0 + \frac{1}{2} \cdot v_0 \cdot T_S \cdot \frac{N-1}{N}$$

$$= v_0 \left( t + \frac{N-1}{2 \cdot N} \cdot T_S \right) + S_0$$

Upon comparison between S and $\overline{S}$, $\overline{S}$ corresponds to data $(N-1) \cdot T_S/(2 \cdot N)$ before time $(T(N-1)=T(0)+(N-1)\cdot T_S/N)$ of finally input (N−1)th data although the vibration component can be removed from S.

Therefore, when the speed $v_0$ is sufficiently low, almost no movement is made during the time $(N-1 \cdot T_S/(2 \cdot N)$, and no problem is posed. However, when the speed $v_0$ is high, or when high-precision alignment is required, an error is caused. For this reason, a moving amount during $(N-1) \cdot T_S/(2 \cdot N)$ is obtained under an assumption that there is no change in speed within a very short period of time, and is added to $\overline{S}$ to estimate the current position. Then, an error can be minimized. More specifically, if $\overline{S}$ at time t is represented by $\overline{S}(t)$, the following relation is established, and the position can be detected without a time delay:

$$2 \cdot \overline{S}\left[\frac{N-1}{N} \cdot T_S\right] = v_0 \cdot \frac{N-1}{N} \cdot T_S + S_0$$

Figure 21:
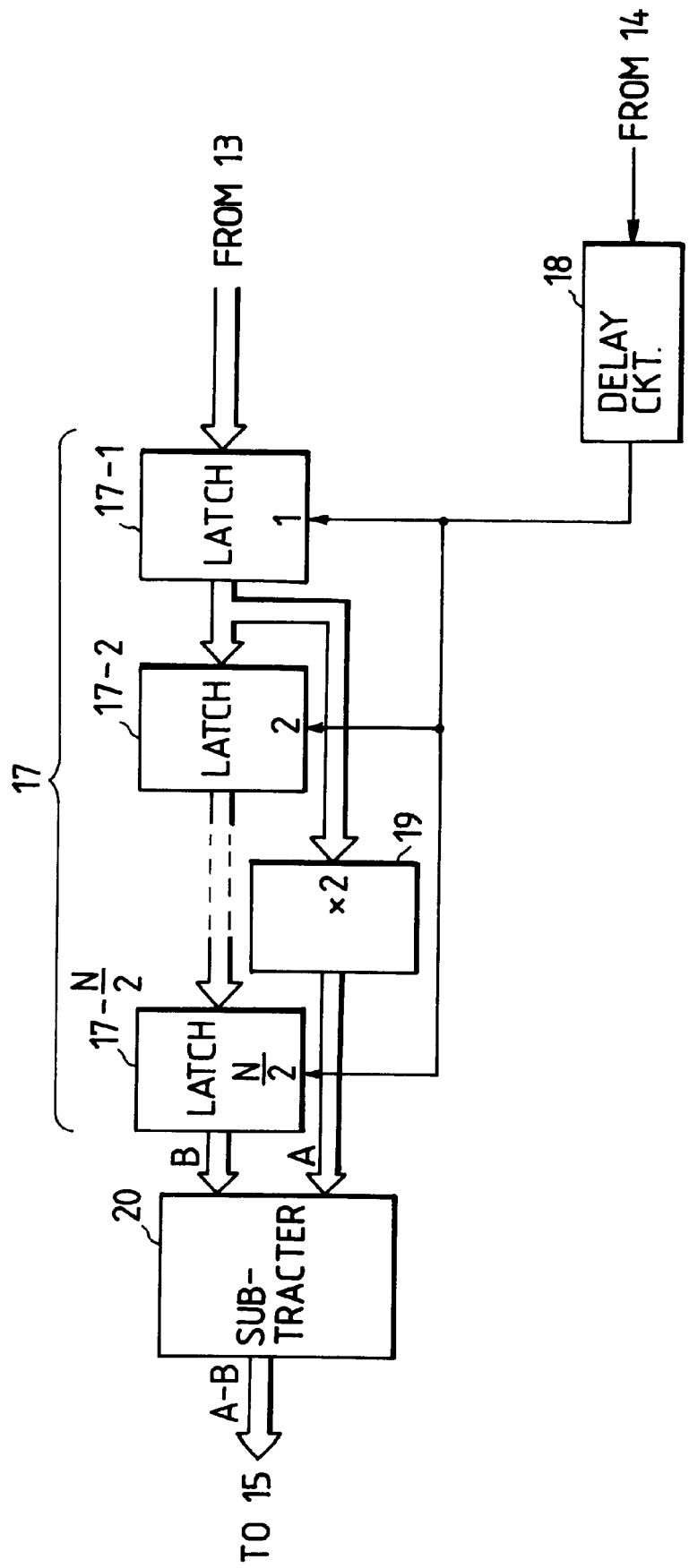
FIG. 21 is a diagram showing an arrangement of a control circuit to be added to the embodiment shown in FIG. 19.

FIG. 21 shows an additional circuit for applying this embodiment to the embodiment shown in FIG. 19. The circuit shown in FIG. 21 includes latches 17, a delay circuit 18 for delaying an output pulse from the OR gate 14, a doubling circuit 19 for doubling the output from the latch 17-1, and a subtractor 20 for subtracting a value at an input B from a value at an input A, and outputting the difference. Thus, the output from the adder 13, which output corresponds to $\overline{S}$, is time-serially latched by the latches 17. Then, an output B from the latch 17-(N/2) as previous data by a time half the vibration period is subtracted from a value A obtained by doubling the output (current value) from the latch 17-1 by the doubling circuit 19, and the current position is input to the CPU 15. The delay circuit 18 is used for causing the latches 17 to latch data after addition is completed in consideration of a delay time of the output from the adder 13 with respect to its input.

In this embodiment, calculations such as latching, addition, subtraction, and the like are executed in a hardware manner. However, the CPU 15 may read the output from the counter 8 in synchronism with the output from the OR gate 14, and may execute all the calculations in a software manner. When the vibration frequency is known beforehand, an oscillator may be used in place of the frequency multiplier 16, or the CPU 15 may generate pulses at predetermined time intervals.

What is claimed is:

1. An apparatus including a vibration actuator for moving an object relative thereto, wherein an electrical signal is applied to an electro-mechanical energy conversion element of the actuator to form a vibration in the actuator, and to obtain a drive force therein based on the vibration, the apparatus comprising:

a detecting circuit that detects a moving state of the object in accordance with a driving force of said actuator and generates an output representing said moving state;

a monitoring circuit that monitors a vibration state of said actuator and outputs a monitor signal having a frequency corresponding to the vibration state; and sampling means for sampling the output of said detecting circuit at a timing determined by the frequency of said monitor signal.

2. An apparatus according to claim 1, wherein said detecting circuit comprises an encoder, and said sampling means samples an output from said encoder in synchronism with the frequency of said monitor signal.

3. An apparatus according to claim 1, wherein frequency signals having a phase difference therebetween are applied to said electro-mechanical energy conversion element to form the vibration.

4. An apparatus according to claim 2, wherein frequency signals having a phase difference therebetween are applied to said electro-mechanical energy conversion element to form the vibration.

5. An apparatus including a vibration actuator for moving an object relative thereto, wherein an electrical signal is applied to an electro-mechanical energy conversion element to form a vibration in the actuator, and to obtain a drive force therein based on the vibration, the apparatus comprising:

a detecting circuit that detects a moving state of the object in accordance with a driving force of said actuator and generates an output representing said moving state;

a monitoring circuit that detects a vibration state of said actuator and generates a monitor signal having a frequency corresponding to the vibration state;

sampling means for sampling the output from said detecting circuit at a timing determined by the frequency of said monitor signal; and a speed processing circuit that determines a moving speed of the object based on the output sampled by said sampling means and adjusts a state of the electrical signal applied to said electro-mechanical energy conversion element in accordance with the determined moving speed.

6. An apparatus according to claim 5, wherein said detecting circuit comprises an encoder, and said sampling means samples an output from said encoder in synchronism with the frequency of said monitor signal.

7. A control apparatus including a vibration actuator for moving an object relative thereto, wherein an electrical signal is applied to an electro-mechanical energy conversion element to form a vibration in the actuator, and to obtain a drive force therein based on the vibration, the apparatus comprising:

means for detecting a moving state of the object in accordance with a driving force of said actuator and for generating an output value representing said moving state;

sampling means for sampling the output value from said moving state detecting means at a timing determined by a frequency of the vibration in said actuator; and evaluating means for evaluating said moving state on the basis of a plurality of output values sampled by said sampling means.

8. An apparatus according to claim 7, wherein said apparatus further comprises means for monitoring a vibration state of said actuator and for generating a monitor signal having a frequency corresponding to the vibration state, said sampling means detects output values from said moving state detecting means in synchronism with a frequency corresponding to an integer multiple of the frequency of said monitor signal and obtains an average value of the output values, and said evaluating means forms the evaluation signal of the detected moving state on the basis of the average value.

9. An apparatus including a vibration actuator for moving an object relative thereto, wherein an electrical signal having a predetermined frequency is applied to an electro-mechanical energy conversion element to form a vibration in the actuator, and to obtain a drive force therein based on the vibration, the apparatus comprising:

a detecting circuit that detects a moving state of the apparatus in accordance with a driving force of said actuator and generates an output representing said moving state; and sampling circuit means for sampling the output of said detecting circuit at a timing determined by a frequency of the electrical signal applied to said conversion element.

10. An apparatus according to claim 9, wherein said sampling circuit means samples an output of said detecting circuit in synchronism with the frequency of said electrical signal.

11. An apparatus according to claim 9, further comprising a processing circuit that processes a plurality of said sampled outputs and generates an evaluation signal.

12. An apparatus according to claim 11, wherein said processing circuit calculates an average value of said plurality of sampled outputs.

13. An apparatus according to claim 1, wherein said sampling means samples the output of said detecting circuit in synchronism with the frequency of said monitor signal.

14. An apparatus including a vibration actuator having a driving vibration for moving an object relative thereto, comprising:

an encoder coupled with said vibration actuator;

a vibration state detecting circuit which detects information corresponding to a frequency of the driving vibration of the vibration actuator;

sampling means for sampling output information of said encoder at a timing determined by information corresponding to the frequency of the driving vibration of said vibration actuator detected by said vibration state detecting circuit; and a processing circuit that processes the sampled output information sampled by said sampling means.

15. An apparatus according to claim 14, wherein said vibration state detecting circuit comprises a monitoring circuit that detects a vibration state of said actuator, wherein said monitoring circuit outputs a signal corresponding to the vibration state, and wherein said sampling means samples output information from said encoder at a timing determined by a frequency of the signal output by said monitoring circuit.

16. A control apparatus including a vibration actuator for moving an object relative thereto, wherein an electrical signal is applied to an electro-mechanical energy conversion element to form a vibration in the actuator, and to obtain a drive force therein based on the vibration, the apparatus comprising:

means for detecting a moving state of the object in accordance with a driving force of said actuator and for generating an output value according to said moving state;

sampling means for sampling an output value from said moving state detecting means at a timing determined by a frequency of the vibration of said actuator; and processing means for processing said moving state on the basis of an output value sampled by said sampling means.

17. A control apparatus including a vibration actuator for moving an object relative thereto, wherein an electrical signal is applied to an electro-mechanical energy conversion element of the actuator to form a vibration in the actuator, and to obtain a drive force based on the vibration, said apparatus comprising:

a detecting circuit that detects a moving state of the object in accordance with a driving force of said actuator;

a monitoring circuit that monitors a vibration state of said actuator and outputs a monitor signal corresponding to the vibration state; and sampling means for sampling the output of said detecting circuit at a timing determined by the monitor signal.

18. A control apparatus including a vibration actuator for moving an object relative thereto, wherein a periodic electrical signal is applied to an electro-mechanical energy conversion element to form a vibration in the actuator, and to obtain a drive force therein based on the vibration, the apparatus comprising:

a detecting circuit that detects a moving state of the apparatus in accordance with a driving force of said actuator; and sampling means for sampling the output of said detecting circuit at a timing determined by the frequency of the periodic electrical signal applied to said conversion element.

19. An apparatus including a vibration actuator having a driving vibration for moving an object relative thereto, comprising:

a detection circuit that detects a moving state of the object; and sampling means for sampling output information of said detection circuit at a timing determined by the driving vibration of said vibration actuator.

* * * * *

UNITED STATES PATENT AND TRADEMARK OFFICE
CERTIFICATE OF CORRECTION

PATENT NO. : 6,031,316
DATED       : February 29, 2000
INVENTOR(S): KENICHI KATAOKA It is certified that error appears in the above-identified patent and that said Letters Patent is hereby corrected as shown below:

Column 2

Line 31, "view of" should read --view of a--.

Column 5

Line 58, "V.C.As" should read --V.C. As--.

Signed and Sealed this

Twenty-seventh Day of March, 2001

Attest:

NICHOLAS P. GODICI

*Attesting Officer*      *Acting Director of the United States Patent and Trademark Office*